US008300666B2

(12) United States Patent
Karam et al.

(10) Patent No.: US 8,300,666 B2
(45) Date of Patent: Oct. 30, 2012

(54) INLINE POWER-BASED COMMON MODE COMMUNICATIONS IN A WIRED DATA TELECOMMUNICATIONS NETWORK

(75) Inventors: Roger A. Karam, Mountain View, CA (US); Frederick R. Schindler, Sunnyvale, CA (US); Wael William Diab, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 2516 days.

(21) Appl. No.: 10/961,904

(22) Filed: Oct. 7, 2004

(65) Prior Publication Data

US 2006/0082220 A1    Apr. 20, 2006

(51) Int. Cl.
*H04J 1/00* (2006.01)
*H04B 3/54* (2006.01)
*G06F 1/26* (2006.01)
*G06F 3/00* (2006.01)

(52) U.S. Cl. ............... 370/496; 710/8; 713/300; 307/4; 307/28

(58) Field of Classification Search .................. 307/1–4, 307/28, 43; 340/310.11, 310.12, 310.16; 713/300; 324/98
See application file for complete search history.

(56) References Cited

U.S. PATENT DOCUMENTS

| | | | |
|---|---|---|---|
| 4,835,737 A | 5/1989 | Herrig et al. | |
| 5,122,691 A | 6/1992 | Balakrishnan | |
| 5,148,144 A | 9/1992 | Sutterlin et al. | |
| 5,237,511 A | 8/1993 | Caird et al. | |
| 5,268,592 A | 12/1993 | Bellamy et al. | |
| 5,289,359 A | 2/1994 | Ziermann | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,491,804 A | 2/1996 | Heath et al. | |
| 5,531,612 A | 7/1996 | Goodall et al. | |
| 5,608,792 A | 3/1997 | Laidler | |
| 5,613,130 A | 3/1997 | Teng et al. | |
| 5,639,267 A | 6/1997 | Loudermilk | |

(Continued)

FOREIGN PATENT DOCUMENTS

WO    WO96/23377    8/1996

OTHER PUBLICATIONS

IEEE Std 802.3af™-2003 (Amendment to IEEE Std 802.3™-2002, including IEEE Std 802.3ae™-2002) IEEE Computer Society Jun. 18, 2003.*

(Continued)

*Primary Examiner* — Melanie Jagannathan
*Assistant Examiner* — Wutchung Chu
(74) *Attorney, Agent, or Firm* — BainwoodHuang

(57) ABSTRACT

Communications over a wired data telecommunications network between and among power sourcing equipment (PSE), powered devices (PDs), and the like, take place over the wired medium by modulating an inline power signal. Any suitable communications protocol may be used and any suitable modulation scheme can be used. Examples of information to be communicated include: changing power requirements or capabilities (higher or lower) and acknowledgements thereof (permitting finer power class gradation than available under existing standards); sensor data; wireless data converted to wired data; status signaling, and the like. Such communications may be used for a number of purposes including supporting redundant provision of services over a network.

65 Claims, 18 Drawing Sheets

U.S. PATENT DOCUMENTS

| | | | |
|---|---|---|---|
| 5,726,506 | A | 3/1998 | Wood |
| 5,742,513 | A | 4/1998 | Bouhenguel et al. |
| 5,758,102 | A | 5/1998 | Carey et al. |
| 5,775,946 | A | 7/1998 | Briones |
| 5,790,391 | A | 8/1998 | Stich et al. |
| 5,790,873 | A | 8/1998 | Popper et al. |
| 5,793,987 | A | 8/1998 | Quackenbush et al. |
| 5,796,185 | A | 8/1998 | Takata et al. |
| 5,808,660 | A | 9/1998 | Sekine et al. |
| 5,809,256 | A | 9/1998 | Najemy |
| 5,834,925 | A | 11/1998 | Chesavage |
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,535,983 | B1* | 3/2003 | McCormack et al. ........ 713/310 |
| 6,541,878 | B1 | 4/2003 | Diab |
| 6,701,443 | B1 | 3/2004 | Bell |
| 6,762,675 | B1 | 7/2004 | Cafiero et al. |
| 6,764,343 | B2 | 7/2004 | Ferentz |
| 6,804,351 | B1 | 10/2004 | Karam |
| 6,958,699 | B1 | 10/2005 | Karam |
| 6,985,713 | B2* | 1/2006 | Lehr et al. .................. 455/343.5 |
| 6,986,071 | B2 | 1/2006 | Darshan et al. |
| 6,996,453 | B2* | 2/2006 | Ahn et al. ..................... 700/213 |
| 7,089,126 | B2 | 8/2006 | Muir |
| 7,145,439 | B2 | 12/2006 | Darshan et al. |
| 7,152,168 | B2* | 12/2006 | Boynton et al. ............. 713/300 |
| 7,154,381 | B2 | 12/2006 | Lang et al. |
| 7,159,129 | B2 | 1/2007 | Pincu et al. |
| 7,162,377 | B2 | 1/2007 | Amrod et al. |
| 7,228,447 | B1* | 6/2007 | Day .............................. 713/340 |
| 7,240,224 | B1* | 7/2007 | Biederman ................... 713/300 |
| 7,492,059 | B2* | 2/2009 | Peker et al. ..................... 307/71 |
| 7,603,570 | B2* | 10/2009 | Schindler et al. ............ 713/300 |
| 2004/0049321 | A1 | 3/2004 | Lehr et al. |
| 2004/0073597 | A1 | 4/2004 | Caveney et al. |
| 2004/0146004 | A1* | 7/2004 | Tidwell et al. ................ 370/216 |
| 2004/0146061 | A1 | 7/2004 | Bisceglia et al. |
| 2004/0190464 | A1* | 9/2004 | Tesdahl et al. ................ 370/278 |
| 2004/0260794 | A1 | 12/2004 | Ferentz et al. |
| 2005/0044431 | A1* | 2/2005 | Lang et al. .................... 713/300 |
| 2005/0125507 | A1* | 6/2005 | Atias et al. .................... 709/220 |
| 2005/0132240 | A1* | 6/2005 | Stineman et al. ............. 713/300 |
| 2005/0197094 | A1 | 9/2005 | Darshan et al. |
| 2005/0257262 | A1 | 11/2005 | Matityahu et al. |
| 2005/0262364 | A1* | 11/2005 | Diab et al. .................... 713/300 |
| 2005/0264981 | A1* | 12/2005 | Anderson et al. ............. 361/679 |
| 2006/0019629 | A1* | 1/2006 | Berson et al. ................. 455/402 |
| 2006/0049818 | A1* | 3/2006 | Montgomery ................ 323/364 |
| 2006/0171399 | A1* | 8/2006 | Ferentz et al. ........... 370/395.53 |

OTHER PUBLICATIONS

IEEE Std 1394a-2000 (Amendment to IEEE Std 1394-1995) Microprocessors and Microcomputers Standards Committee of the IEEE Computer Society Published Jun. 30, 2000.*

"IEEE Standard 802.3af™", IEEE Standard for Information Technology—Telecommunications and Information Exchange Between Systems—Local and Metropolitan Area Networks—Specific Requirement, IEEE The Institute of Electrical and Electronics Engineering, Inc., Jun. 18, 2003.

"3Com® NJ100 Network Jack Power", printed from http://www.poweroverethernet.com/manual/content/view/ful1/776/, 3Com, Tuesday, Mar. 18, 2003.

3Com User Guide-3Com IntelliJack, Model NJ220, Version 1.0, 3Com, Nov. 2003.

International Search Report for International Application No. PCT/US2005/036328, date of mailing Aug. 3, 2006.

Invitation to Pay Additional Fees (Partial International Search), Application No. PCT/US2005/036328, date of mailing May 26, 2006.

Mendelson, G., White Paper "All You Need to Know About Power Over Ethernet (PoE) and the IEEE 802.3af Standard", pp. 1-24, Jun. 2004.

International Search Report for International Application No. PCT/US2005/036392, date of mailing Mar. 10, 2006.

"3Com User Guide," 3Com Network Jack, Model NJ200, Version 1.0, 3Com, Sep. 2002.

International Search Report for International Application No. PCT/US2005/036329, date of mailing Sep. 4, 2006.

International Preliminary Report on Patentability Application No. PCT/US2005/036328, date of mailing May 18, 2007.

Lynn, K., "Universal Serial Bus (USB) Power Management," Wescon Conference, IEEE, Sep. 1998, pp. 194-201.

* cited by examiner

| A | B | ΔV |
|---|---|---|
| 0 | 0 | FLOATING |
| 0 | 1 | 0 |
| 1 | 0 | $-V_{D1}$ |
| 1 | 1 | 0 |

| A | B | I |
|---|---|---|
| 0 | 0 | 0 |
| 0 | 1 | Vz/R$_2$ |
| 1 | 0 | Vz/R$_1$ |
| 1 | 1 | Vz/R$_1$ + Vz/R$_2$ |

INLINE POWER-BASED COMMON MODE COMMUNICATIONS IN A WIRED DATA TELECOMMUNICATIONS NETWORK

STATEMENT OF RELATED CASES

This patent may be considered to be related to commonly owned U.S. patent application Ser. No. 10/961,864 filed on Oct. 7, 2004 and entitled "Bidirectional Inline Power Port" in the names of inventors Daniel Biederman, Kenneth Coley and Frederick R. Schindler.

This patent may be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero.

This patent may be considered to be related to commonly owned U.S. patent application Ser. No. 10/982,383 filed on Nov. 5, 2004 and entitled "Power Management for Serial-Powered Device Connections" in the name of inventor Roger A. Karam.

This patent may be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero.

This patent may be considered to be related to commonly owned U.S. patent application Ser. No. 10/981,203 filed on Nov. 3, 2004 and entitled "Powered Device Classification In A Wired Data Telecommunications Network" in the name of inventors John Wakerly and Roger A. Karam.

This patent may be considered to be related to commonly owned U.S. patent application Ser. No. 10/981,202 filed on Nov. 3, 2004 and entitled "PHY-Based Current Imbalance Compensation for Magnetics in a Wired Data Telecommunications Network" in the names of inventors Roger A. Karam and John F. Wakerly.

This patent may be considered to be related to commonly owned U.S. patent application Ser. No. 10/845,021 filed May 13, 2004 and entitled "Improved Power Delivery over Ethernet Cable" in the names of inventors Wael William Diab and Frederick R. Schindler.

This patent may be considered to be related to commonly owned U.S. Pat. No. 6,541,878 entitled "Integrated RJ-45 Magnetics with Phantom Power Provision" in the name of inventor Wael William Diab.

This patent may be considered to be related to commonly owned U.S. patent application Ser. No. 10/850,205 filed May 20, 2004 and entitled "Methods and Apparatus for Provisioning Phantom Power to Remote Devices" in the name of inventors Wael William Diab and Frederick R. Schindler.

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired data telecommunications network (such as, for example, the well-known Ethernet) from power sourcing equipment (PSE) to a powered device (PD) over a link section. The power may be injected by an endpoint PSE at one end of the link section or by a midspan PSE along a midspan of a link section that is distinctly separate from and between the media dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission and reception (collectively: "transceiving") of Ethernet packets with the transmission and reception of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, floating 48 Volt power currently available at a range of power levels from about 4 watts to about 15 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16*aa* and 16*ab* is conducted from center-tapped transformers 20*aa* and 20*ab* to powered device (PD) 22*a* for use thereby as shown. In FIG. 1B a data telecommunications network 10*b* comprises a switch or hub 12*b* with integral power sourcing equipment (PSE) 14*b*. Power from the PSE 14*b* is injected on the two non-data carrying Ethernet twisted pairs 16*bc* and 16*bd*. Data carrying Ethernet twisted pairs 16*ba* and 16*bb* are unused in this variant for power transfer. The power from non-data carrying Ethernet twisted pairs 16*bc* and 16*bd* is conducted to powered device (PD) 22*b* for use thereby as shown. In FIG. 1C a data telecommunications network 10*c* comprises a switch or hub 12*c* without integral power sourcing equipment (PSE). Midspan power insertion equipment 24 simply passes the data signals on the two data carrying Ethernet twisted pairs 16*ca*-1 and 16*cb*-1 to corresponding data carrying Ethernet twisted pairs 16*ca*-2 and 16*cb*-2. Power from the PSE 14*c* located in the Midspan power insertion equipment 24 is injected on the two non-data carrying Ethernet twisted pairs 16*cc*-2 and 16*cd*-2 as shown. The power from non-data carrying Ethernet twisted pairs 16 cc-2 and 16*cd*-2 is conducted to powered device (PD) 22*c* for use thereby as shown. Note that powered end stations 26*a*, 26*b* and 26*c* are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1-2, Pair 3-4 or Pair 1-2+Pair 3-4. In the circuit shown in FIG. 1E a PD associated with Pair 1-2 is powered by Inline Power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline Power is also available through techniques that are non-IEEE 802.3 standard compliant as is well known to those of ordinary skill in the art.

In many cases where PDs are used, it may be desirable to provide some redundancy in terms of data and/or power delivery for cases in which equipment (hubs, switches, cable and the like) providing the power and/or data fails to continue to do so.

SUMMARY OF THE INVENTION

Communications over a wired data telecommunications network between and among power sourcing equipment (PSE), powered devices (PDs), and the like, take place over the wired medium by modulating an inline power signal. Any suitable communications protocol may be used and any suitable modulation scheme can be used. Examples of information to be communicated include: changing power requirements or capabilities (higher or lower) and acknowledgements thereof (permitting finer power class gradation than available under existing standards); sensor data; wireless data converted to wired data; status signaling, and the like. Such communications may be used for a number of purposes including supporting redundant provision of services over a network.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1A:
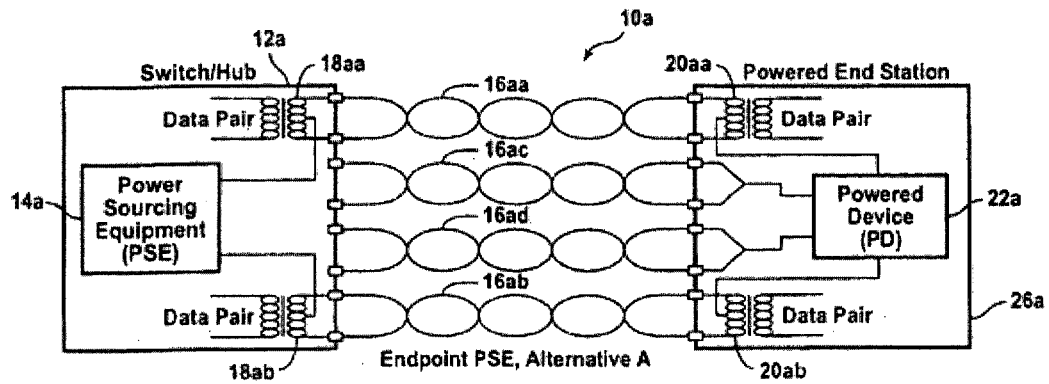
FIGS. 1A, 1B, 1C, 1D and 1E are electrical schematic diagrams of portions of data telecommunications networks in accordance with the prior art.
Figure 1B:
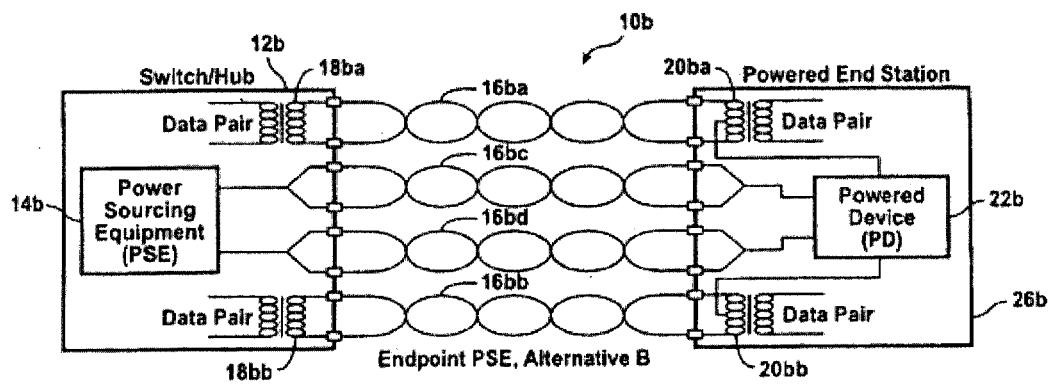
Figure 1C:
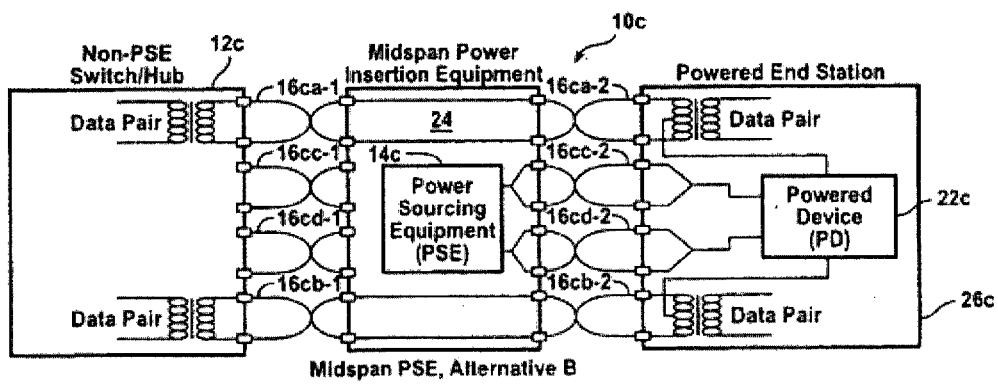
Figure 1D:
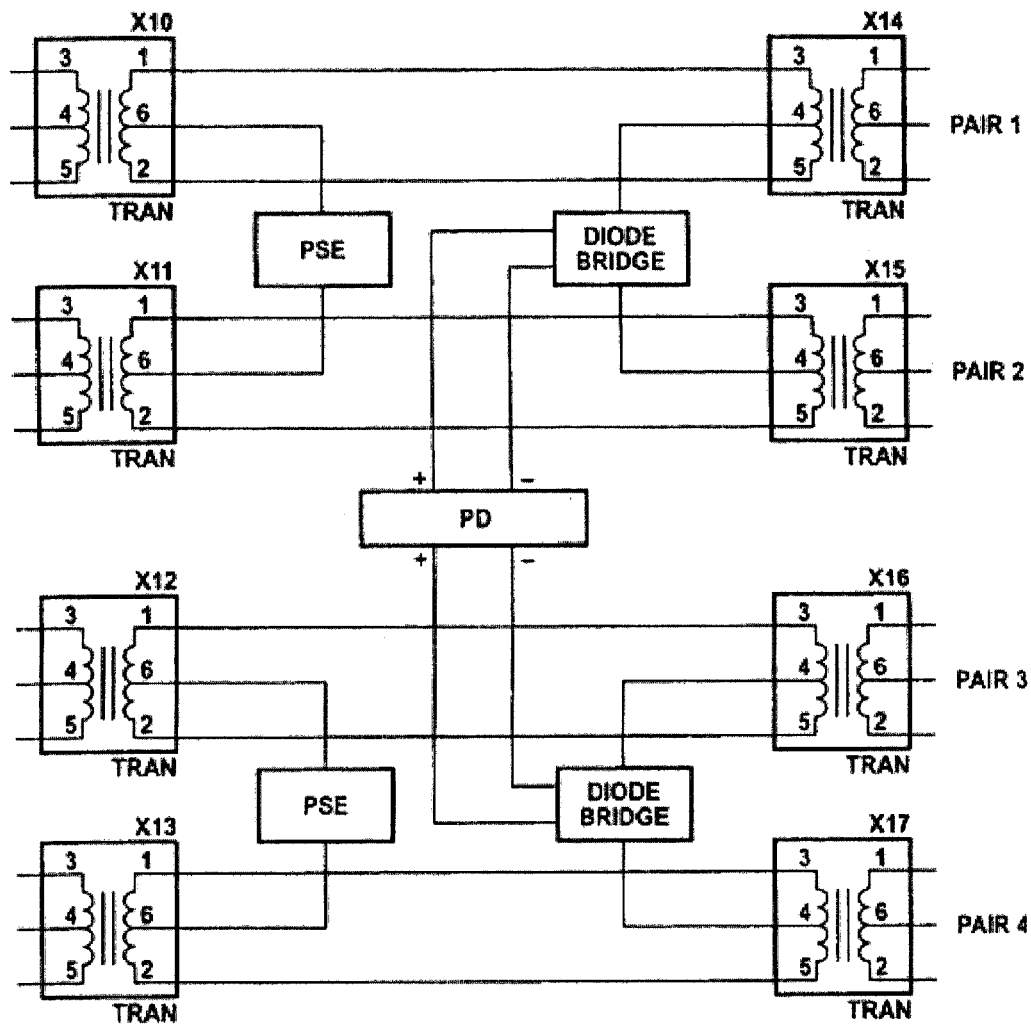
Figure 1E:
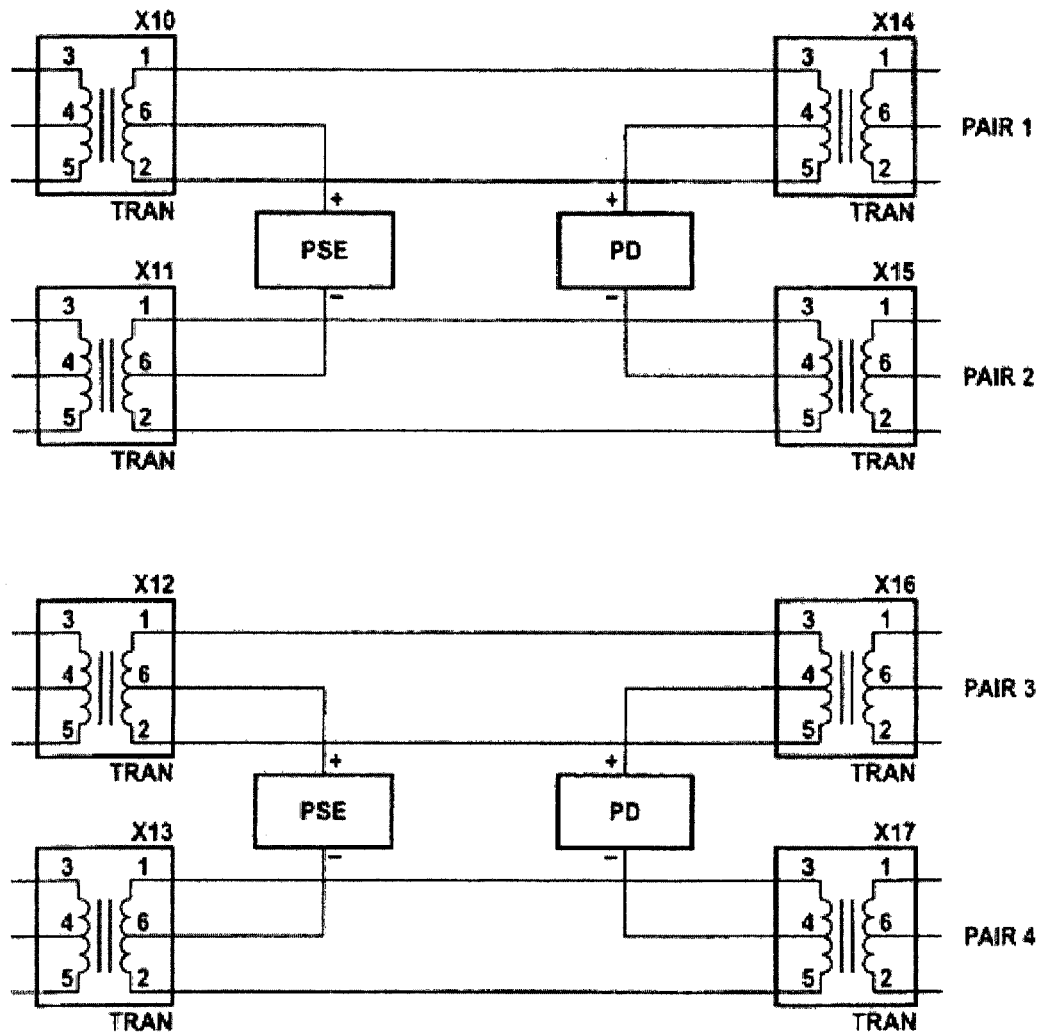

Embodiments of the present invention described in the following detailed description are directed at inline power-based common mode communications in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the IEEE 802.3af standard, there is a negotiation between a PSE and a PD before power is made available to the PD from the PSE. The process of the negotiation is spelled out in detail in the standard, however, it involves the PSE applying some limited power to the PD and looking for a certain resistance (via a received current) which indicates to the PSE (1) that the device is an IEEE 802.3af standard compliant PD and (2) the "class" of which the PD is a member. In IEEE 802.3af standard parlance a PD is either class 0, 1, 2, 3 or 4 (at the present time). Classes 0, 3 and 4 (under the current version of the standard) have a minimum power level at the output of the PSE of 15.4 watts (W). Class 1 has a minimum power level at the output of the PSE of about 4 W and class 2 has a minimum power level at the output of the PSE of about 7 W. Power is allocated in this class-based system for a number of reasons. One important reason is that a PSE has a finite amount of power that can be allocated to attached PDs. Since in many cases each attached PD will not need a maximum amount of power ever or at all times, the devices are classified based upon their maximum power requirements. In this way, the PSEs may be constructed with a reasonable amount of power allocable to attached PDs rather than having every port be required to provide up to a maximum power level, e.g., 15.4 W. In devices with large port counts, e.g., 48, the difference between providing power at a maximum level for all ports versus providing it on a demand basis can be very significant.

The negotiation phase is also referred to as "discovery". While this standard-based discovery protocol serves the important purpose of allocating inline power resources, it only can allocate power among the 5 defined classes (0, 1, 2, 3 and 4). It makes no provision for finer gradations of power allocation or time-dependent power allocation. For example, a device that only needs 5 W of power will be allocated 7 and one that only needs 8 W will be allocated 15.4 W. This is wasteful of resources. Similarly, a device that needs 8 W when it is being used but spends ⅔ of its time in a "Sleep" mode where it only needs 0.5 W of power will still be allocated 15.4 W all of the time. This is similarly wasteful of resources.

Accordingly, it would be desirable to provide a mechanism for permitting finer gradations of allocated power and time-dependent or demand dependent allocations of power in such systems, as well as other types of information. This may be accomplished in accordance with the principles of the present invention by providing a communications system for PSE and PD devices (sometimes referred to herein as "stations") to communicate with each other (particularly for the PD to communicate to the PSE) to permit the PSE to adjust allocated power to the PD based upon time-dependent demand and/or based upon more precise gradations of required power, and/or to communicate other types of information among themselves.

Examples of applications where this invention may be used include virtually all situations where a PSE may provide inline power to a PD over a wired data telecommunications network such as Ethernet and the like. A typical example would be a local area network (LAN) switch providing power and data telecommunications to a voice over internet protocol (VoIP) telephone, or to a laptop or other device. Those of ordinary skill in the art will now recognize a plethora of device to device combinations (e.g., PSE to PSE; PSE to power tap(s); PSE to multiple PSE; PSE to PD; PSE to multiple PD; PD to PSE; PD to multiple PSE; PD to PD; PD to multiple PD; PD to PSE(s) and PD(s); PSE to PD(s) and PSE(s)) that are hereby made possible and are therefore within the scope of the present invention. In addition to power availability and power required types of messages, sensor readings of virtually any type (e.g., temperature, humidity, pressure, conditions, HVAC (heating ventilation and air conditioning) system information, building emergency system control information, alarm system information, process control information in a mechanized fabrication system, and the like) could be transmitted from a sensor connected to the PD/PSE, voltage measurements (which could be used for cable length, loss or change calculations), and the like may also be sent over the inline power communications link. Additionally, a signal received wirelessly, for example, at a device such as a PD or PSE, could be converted to inline power modulation, and transmitted to another device or devices.

When the negotiation phase (detection and classification) is underway, a small voltage is applied and a return current read, then other voltages are applied and return currents read, and if successful, full power is applied (for example, in the IEEE 802.3af as presently constituted this is typically 44-57 VDC at some specified maximum current). Below this range, an Under Voltage LockOut (UVLO) condition applies to prevent operation of most PDs. Accordingly, in one embodiment of the present invention the PSE/PD communication described herein is for operation while the UVLO condition does NOT apply, i.e., after discovery and classification stages have been at least initially completed and inline power is applied from the PSE to the PD. In another embodiment of the present invention, the UVLO condition may apply to any voltage less than 20 VDC. Nothing herein is intended to limit the invention from operating at a voltage lower than 20 VDC once UVLO has been initially surpassed during the power-up phase, e.g., during a power failure after the PD has been operating for some time and is now losing voltage/power for some reason it would be desirable to be able to communicate that fact back to a PSE or other device at least for a short time so that appropriate corrective action may take place.

In order to carry out communications between two devices such as a PD/PSE and a PD/PSE, one needs a communications medium and a signaling scheme. If the communications medium is to be the existing wires of the wired data telecommunications network segment coupling the PD/PSE and the PD/PSE then, because the signaling may take place after the initial IEEE 802.3af discovery process is complete, it should not interfere with the signals already being communicated over the medium. In accordance with the present invention, the medium is the existing cabling and the signaling scheme is to modulate the common mode power signal carried among the devices on a network segment having inline power available to it. In accordance with an embodiment of this invention, a PSE modulates the voltage that it sources (nominally about 48V direct current (DC) floating) and a PD modulates the current that it draws. (If an unused conductor pair is available, the PD may also or instead use voltage modulation on that pair, if desired). The PD sees the voltage modulation and detects and decodes the message accordingly, similarly, the PSE sees the current modulation and detects and decodes that message accordingly. The communication protocol can be any protocol, however, digital protocols will in most cases provide the most noise immunity and the easiest detection. Existing protocols for the serial transmission of digital data over low bandwidth communications links (such as, for example, the RS-232, RS-422 and like protocols, as well as many others) may be used, or something as simple as the Morse Code could be used.

Because the communication system envisaged by the present invention does not require the use of the PHY to carry out communications, it will work in most situations, even if some portions of the network are "down" or inoperable. It works with a fully functional Ethernet condition, with Ethernet network failures such as broadcast storms, with any PHY failure, with any cable single wire failure and with some cable double (or more) wire failures.

Communications over a wired data telecommunications network between power sourcing equipment (PSE) and a powered device (PD) take place in accordance with an embodiment of the present invention over the wired medium by current modulating an inline power signal for PD to PSE communications and voltage modulating the inline power signal for PSE to PD communications. Any suitable communications protocol may be used and any suitable modulation scheme may be used. Examples of information to be communicated include changing power requirements (higher or lower) by the PD to the PSE and acknowledgements thereof or advice of available power (higher or lower) from the PSE to the PD. This communications capability also enables finer power class gradation than available under existing standards.

This approach to PSE-PD and PD-PSE communications requires very little in the way of resources at the PD or PSE end of the communications path. As a result, this process can initially take place early in the bootstrap process (the initial power-on and boot-up of the PSE and/or PD). Other types of communications which require use of the PHY (such as PHY-PHY communications or various proprietary discovery protocols such as Cisco® Discovery Protocol™ (CDP™)) require that the PSE and PD be fully up and running before communications can take place. This can sometimes take minutes and for certain applications, such as voice over internet protocol (VoIP) telephones this may be an unacceptable delay to a user. Using the approach of the present invention the power only needs to have stabilized (much less than a minute required) so that a message can be sent and received.

While it is contemplated that many of the messages communicated between the PSE and the PD will be power-related messages, e.g., PD to PSE: PD needs a certain amount of power right now (may be more than or less than a previously requested amount of power); and PSE to PD: PSE has all of (or part of, or none of) the power requested and is assigning power to PD accordingly, those of ordinary skill in the art will no appreciate that the invention is applicable in other situations where it is advantageous to provide a communications path between the PSE and the PD.

Figure 2A:
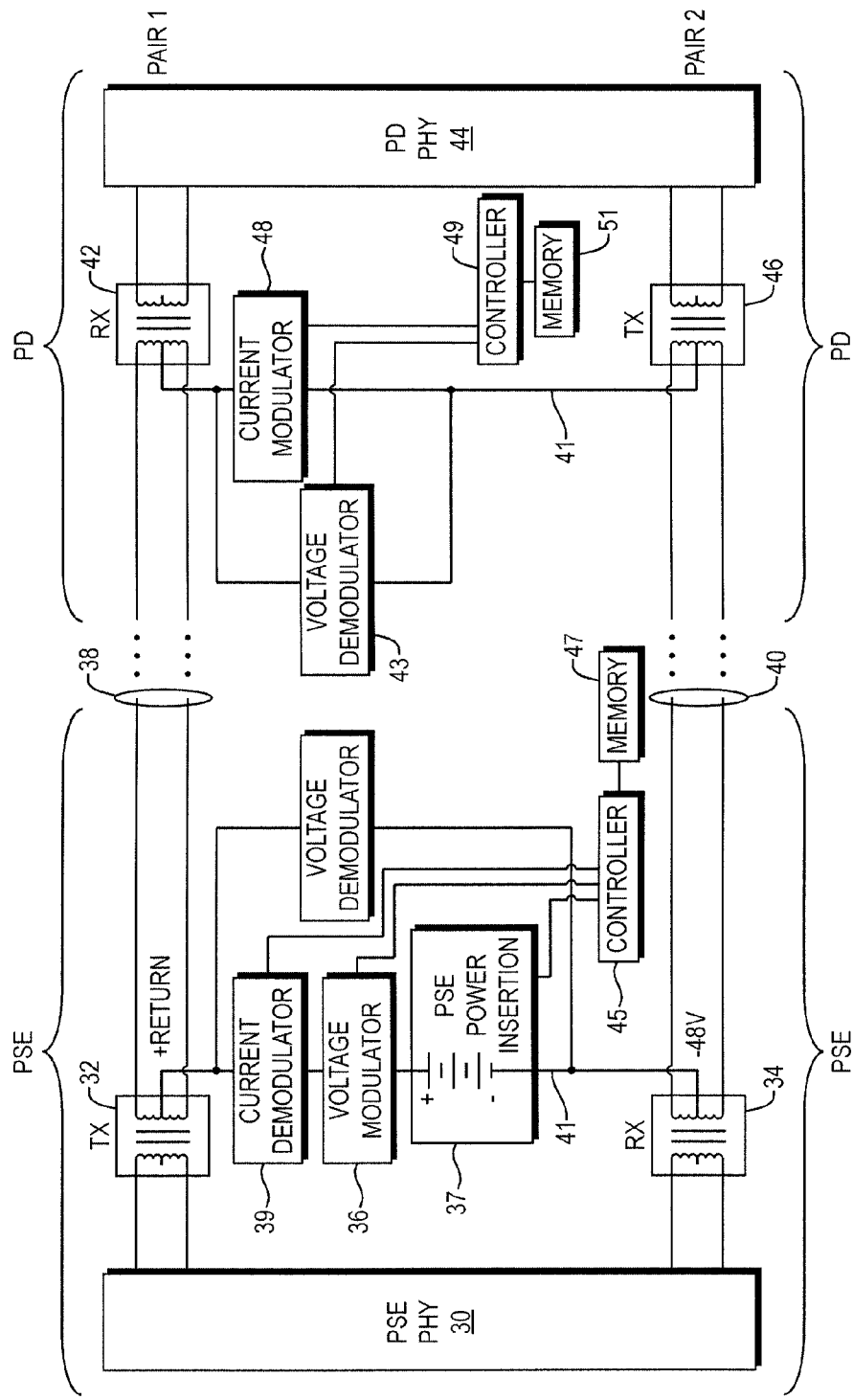
FIGS. 2A and 2B are electrical schematic/block diagrams of a wired data telecommunications network segment in accordance with an embodiment of the present invention.

The circuitry necessary to implement the modulation scheme is fairly straightforward. Turning now to FIG. 2A, a simplified electrical schematic diagram of a wired data telecommunications network segment in accordance with an embodiment of the present invention is shown. PSE PHY 30 is coupled to a transmit (TX) center-tapped transformer 32 and a receive (RX) center-tapped transformer 34 in a conventional manner. A voltage modulator block 36 is coupled in series between the PSE power injection block 37 and the center-tap of one of the center-tapped transformers 32 and 34 which are, in turn, coupled in series with the TX conductor pair 38 and the RX conductor pair 40 as shown. Note that the voltage modulator may be inserted in the positive leg of the PSE power injection block 37 as shown or in the negative leg (not shown in FIG. 2A). A current demodulator block 39 is provided which is coupled to the inline power loop 41 and utilizes conventional demodulation techniques such as peak detection, threshold detection or timing and phase detection implemented using conventional analog to digital converters and logic as is known to those of ordinary skill in the art. At the PD side of the communications link, a receive center-tapped transformer 42 is coupled across conductor pair 38 (pair 1) and to PD PHY 44, and a transmit center-tapped transformer 46 is coupled across pair 40 (pair 2). Between the network-side center taps of transformer 42 and transformer 46 is coupled a current modulator circuit 48. Similarly, a voltage demodulator circuit block 43, coupled between the center-taps of center-tapped transformers 42 and 46, is provided in the power loop 41 at the PD side of the communications link to demodulate communications modulated onto the inline power using conventional techniques such as peak detection or threshold detection for AM modulated signals and timing and/or phase detection for FM, Pulse and PWM modulated signals. In an embodiment of the present invention a controller 45 and a memory store 47 are provided at the PSE side to manage communications by controlling the voltage modulator 36 and the demodulator 39. A communication to be sent to the PD side may be stored in memory 47 prior to modulation onto the inline power loop 41. Similarly, in an embodiment of the present invention a controller 49 and a memory store 51 are provided at the PD to manage communications by controlling the modulator 48 and demodulator 43. A communication to be sent to the PSE may be stored in memory 51 prior to modulation onto the inline power loop 41. (Note that the references herein to pair numbers and conductor numbers are for convenience only and do not correspond to the type T568B/T568A Ethernet conductor numbering and conductor pair numbering scheme).

Figure 2B:
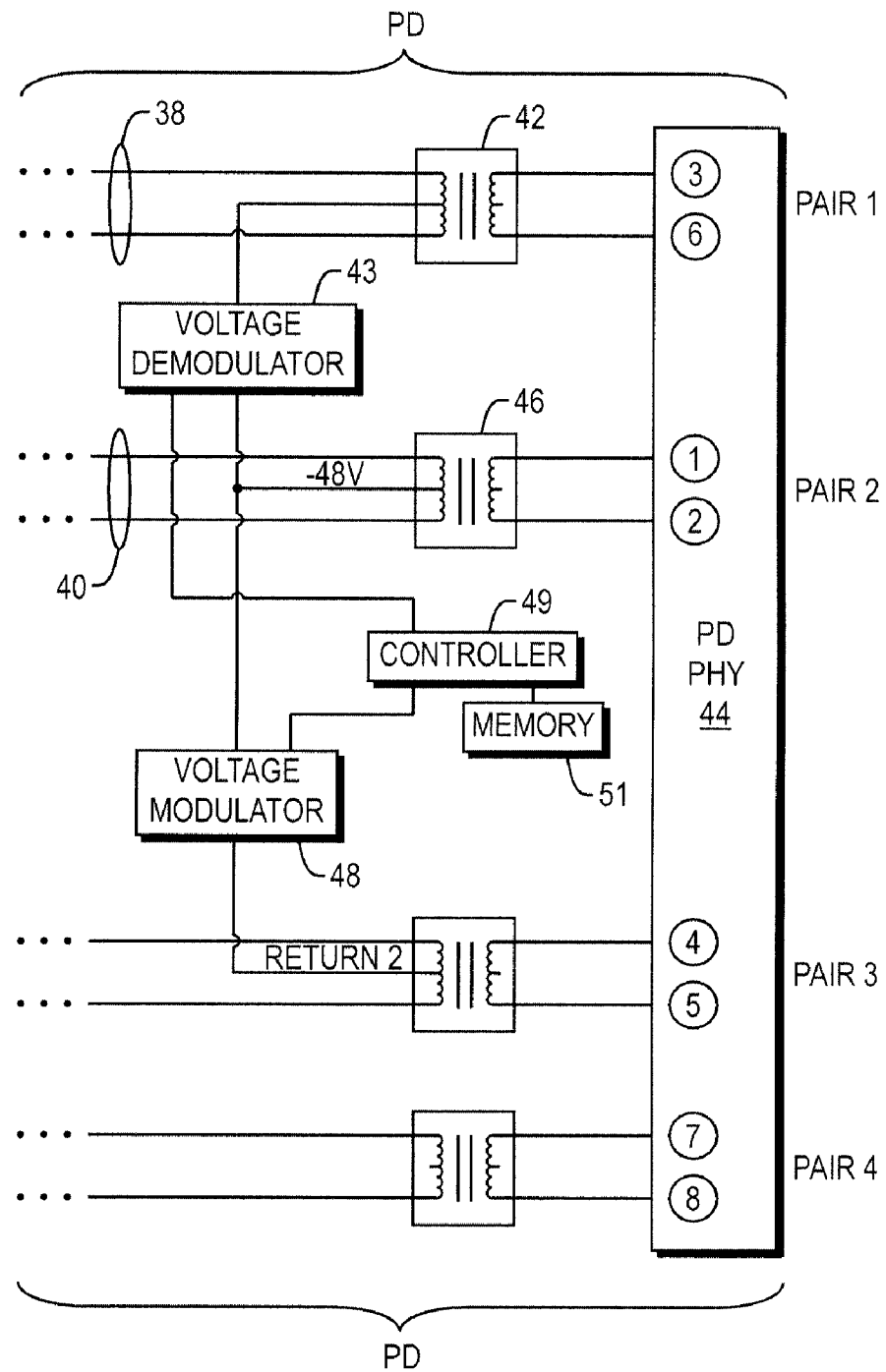

Turning now to FIG. 2B, a version of the invention is presented where one form of communication occurs over a first two pairs of conductors, e.g., voltage modulation communication from a PSE to, for example, a PD. Communications in the other direction take place utilizing one or two extra pairs of conductors—here Pair 3 and Pair 4. In the circuit illustrated in FIG. 2B, Pair 3 and Pair 1 are used to support voltage modulation communication from a PD to a PSE. The same could be done with Pair 3 and Pair 4. Note also that in the case of some sort of failure where both conductors of a pair of conductors are not conducting, the common mode communications contemplated by the present invention can take place over any pair of conductors regardless of whether up to one of those conductors has failed or become non-conducting.

Figure 3:
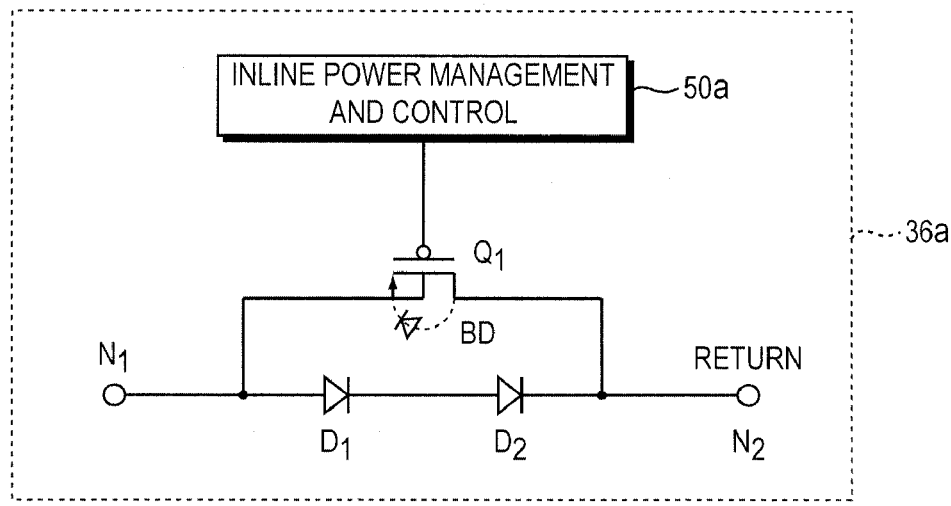
FIGS. 3, 4, 5, 7 and 9 are electrical schematic diagrams of voltage modulators for use at power sourcing equipment (PSE) in accordance with various embodiments of the present invention.

Voltage modulator circuit 36 may be any of circuits 36*a* (FIG. 3), 36*b* (FIG. 4), 36*c* (FIG. 5), 36*d* (FIG. 7), 36*e* (FIG. 9) or any similar or other circuits known to those of ordinary skill in the art for modulating a voltage signal. Generally this may be done by adding a voltage or subtracting a voltage (or some combination of the two) to the base −48V inline power signal to provide AM modulation. For PWM, FM and the like the controller can be configured to switch the signal in a time-dependent manner, e.g., by switching the gates of the FETs in the modulator circuits of FIGS. 3, 4, 5, 7 and 9. The various circuits shown are now briefly described. In FIG. 3, circuit 36a (for use in the positive leg of the PSE power injection block 37) uses one or more (a pair are shown) of diodes D1, D2, etc. to cause predetermined voltage drops in the circuit between nodes N1 and N2, When the voltage drops are desired to occur, switch Q1 (which may be any form of switch such as a MOSFET (metal oxide semiconductor field effect transformer) of either p or n channel type, a relay, a solid state relay, or the like) is set to open and current is forced to conduct through diodes D1 and D2. When the voltage drops are not desired, Q1 is set to conduct and shorts out diodes D1 and D2 thus avoiding the voltage drop between nodes N1 and N2. The modulation may be simple amplitude modulation (AM) (ON-OFF-ON-OFF) signaling of Q1 induces amplitude modulation of the voltage signal) or it may be frequency modulation (FM) or pulse modulation (PM) or pulse-width modulation (PWM) and the like (implemented by the controller at the PD (49) or PSE (45) changing the frequency or pulse width of the voltage/current at a relatively fixed amplitude). The modulation may be of a simple bi-state mode (ON-OFF) or it may be multiple state (ON-LESS-ON-OFF) and the like. Such schemes are well known in other contexts for the transmission of data over, e.g., radio waves. In accordance with the embodiment illustrated in FIG. 3, Inline Power Management and Control block 50a controls the state of switch Q1. It also has the ability to receive information from other circuitry, store it, and control the voltage modulator circuit so as to send it. In the circuit of FIG. 3 Q1 is shown as a pFET (p-channel MOSFET). This is required in this particular application as the body diode BD of Q1 must oppose the normal flow of current through Q1. In a modulator disposed in the negative leg of the PSE power injector block 37, nFETs (n-channel MOSFETS) would be used.

Figure 4:
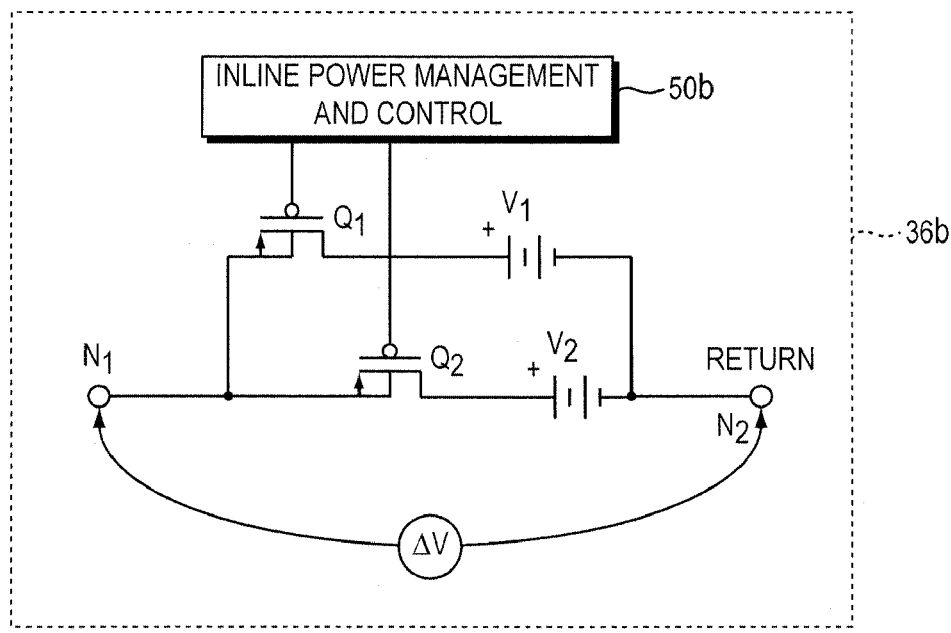

Turning now to FIG. 4, an alternate version of a voltage modulator 36b is shown which provides the same basic functionality as voltage modulator 36a. In this embodiment, Inline Power Management and Control block 50b controls both switches Q1 and Q2 to switch voltage modulator voltage sources V1 and V2 in and out of the positive leg of the PSE power injector block 37. If Q1 is on V1 gets subtracted from the positive leg reducing the total voltage applied across the center-taps of transformers 32 and 34. If Q2 is on V2 gets subtracted. If they are both on, they both get subtracted, yielding a 4 state output: $\Delta V=-V1, -V2, -(V1+V2), 0$. Those of ordinary skill in the art will now appreciate that any desired combination of additive and/or subtractive voltage changes may be implemented in this manner.

Figure 5:
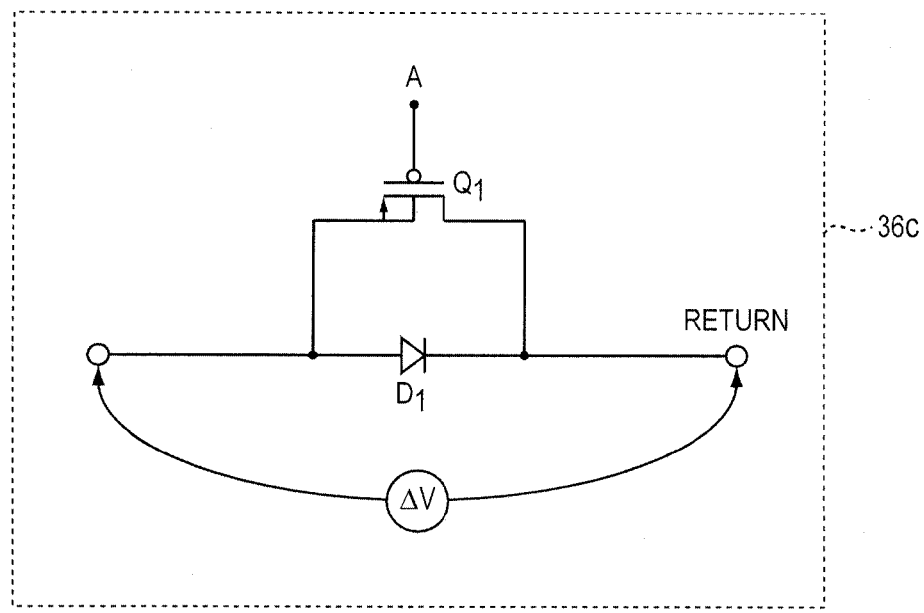
Figure 6:
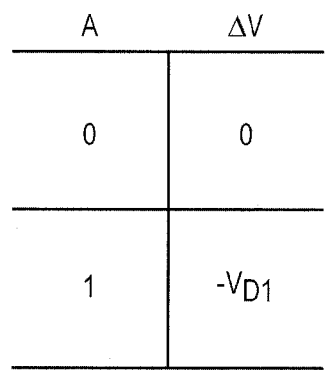
FIGS. 6, 8 and 10 are tables corresponding to the operation of the voltage modulators of FIGS. 5, 7 and 9, respectively.

Turning now to FIGS. 5 and 6, FIG. 5 illustrates yet another voltage modulator circuit 36c which may be used in pace of block 36 of FIG. 2A. In this case a single diode D1 (causing a fixed voltage drop $\Delta V$) gets switched in and out of the positive leg. FIG. 6 is a table illustrating the effects of the two states of A. If more amplitude is desired, more diodes may be used in series to create a larger voltage drop and/or some combination of one or more voltage sources (positive or negative) may be used.

Figure 7:
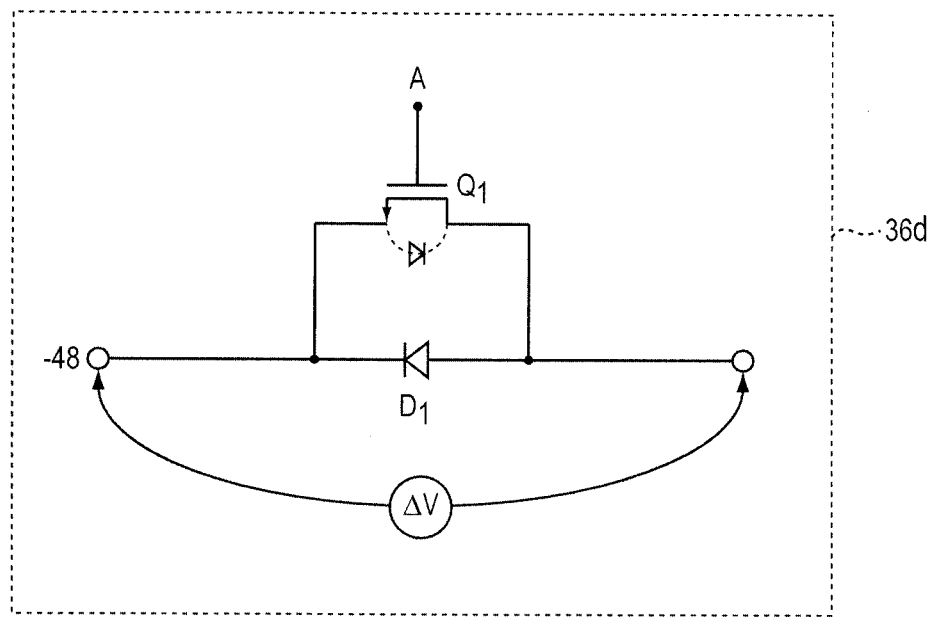
Figure 8:
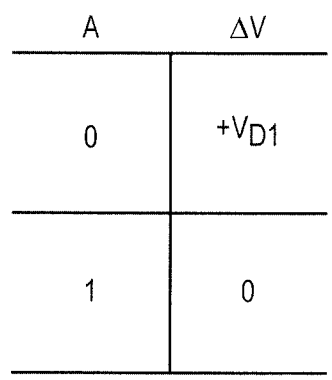

FIGS. 7 and 8 are a modification of the approach of the embodiment of FIG. 5. In this embodiment (36d of FIG. 7) switch Q1 (nFET) switches one or more diodes into and out of the negative leg. FIG. 8 is a table illustrating the effects of switching the applied A signal.

Figures 9, 10:
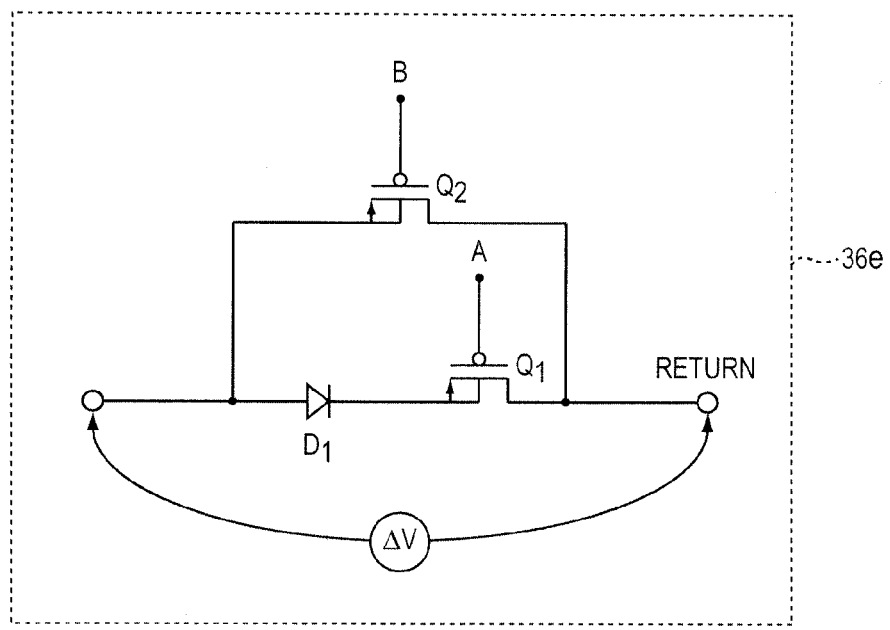

FIGS. 9 and 10 represent a further modification of the voltage modulator. Circuit 36e is controlled by A and B signals. The table for the A and B signals is shown in FIG. 10. FIG. 9 is a version of a voltage modulator disposed in the positive leg which uses p channel MOSFETs Q1 and Q2.

Figures 11, 12:
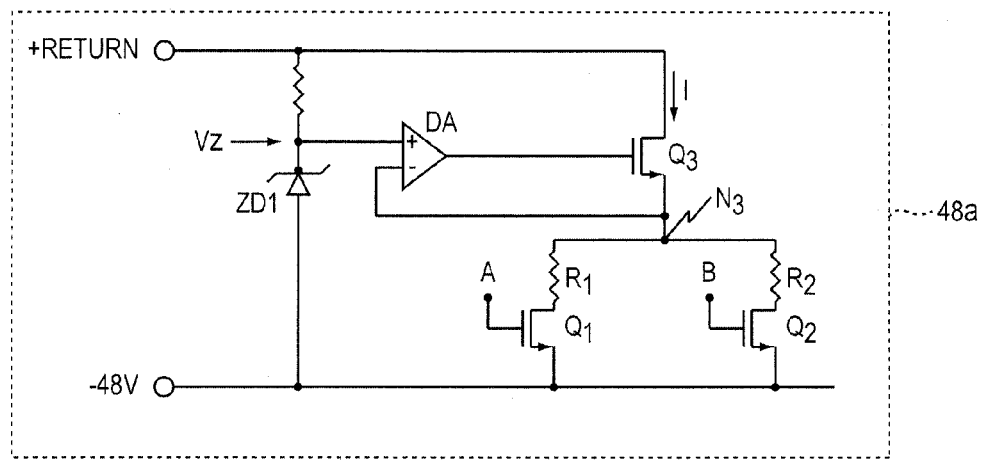
FIG. 11 is an electrical schematic diagram of a current modulator for use at a powered device (PD) in accordance with an embodiment of the present invention.
FIG. 12 is a table corresponding to the operation of the current modulator of FIG. 15.

FIG. 11 is an illustrative circuit depicting a current modulator disposed across the positive ("RETURN") and negative (-48V) legs of the inline power supply at the PD. A zener diode ZD1 sets the voltage at node Vz. A differential amplifier DA looks at the Vz node and the N3 node and thus controls switch Q3 to control current I. Table 12 describes the four output states. If A is asserted, current Vz/R1 flows; if B is asserted current Vz/R2 flows. Q1, Q2 and Q3 are shown as nFETs but other switches may be used in their place as will now be apparent to those of ordinary skill in the art.

Figure 13:
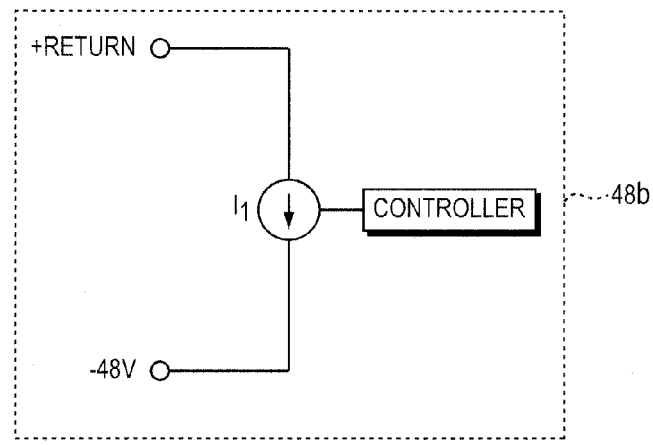
FIGS. 13 and 14 are electrical schematic diagrams of alternative current modulators for use at a PD in accordance with various embodiments of the present invention.
Figure 14:
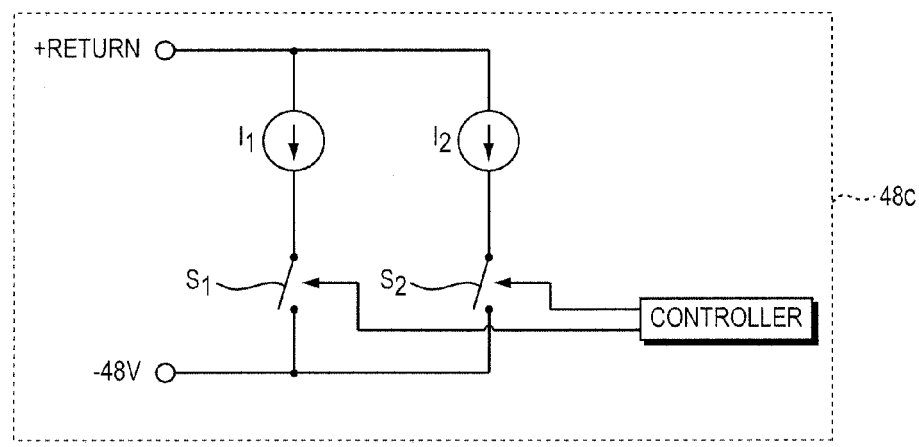

FIGS. 13 and 14 are schematic diagrams of alternative current modulators 48b and 48c. Current modulator 48b has a controller which determines and/or stores a message to be communicated and which sends a modulating signal to current source I1 which changes the current it sources in response to the signal from the controller. "Determining" is intended to include reading out such a stored message. The modulated current signal may be digital (on-off) or analog and may be AM, FM, PM or PWM modulated as before (or some combination of such modulation techniques). The version of current modulator 48c shown in FIG. 18 has two current sources I1 and I2 which are both controlled by a controller. It operates as a two-bit current digital to analog converter (DAC) In this version I1 and I2 may be switched on and off so that the current from the modulation circuit is 0, I1, I2 or I1+I2. Those of ordinary skill in the art will now realize that many more circuits for accomplishing current modulation are possible and within the scope of the present invention.

Where additional conductor pairs are available (such as in 10 Base T and 100 Base T Ethernet networks which only utilize two pairs of conductors) the PD may current modulate or voltage modulate a signal back to the PSE using the techniques described above but utilizing instead an unused (for data) conductor pair, if desired.

The communications protocol may be implemented in any manner desired, however, an example of such a protocol includes a DATA START codeword followed by DATA followed by a DATA STOP codeword. Other codewords could be to tell the PSE that the PD has gone into SLEEP mode (e.g., it hasn't been used in a certain amount of time or it is after hours, or the like) or OFF mode. Codewords may be organized in any desired manner, but examples include a fixed number of pulses (say one or two diode voltage drop pulses so that the voltage monitored at the PD changes) at a fixed predetermined frequency so that the signal may be easily distinguished from noise. Codewords generated with current modulation may be set to be a few tens of milliamps or more, possibly depending upon the total current assigned, also transmitted at some predetermined fixed frequency. Those of ordinary skill in the art will now realize that many protocols for current and voltage modulation communications between PSE and PD are possible and within the scope of the present invention and appended claims.

Figure 15:
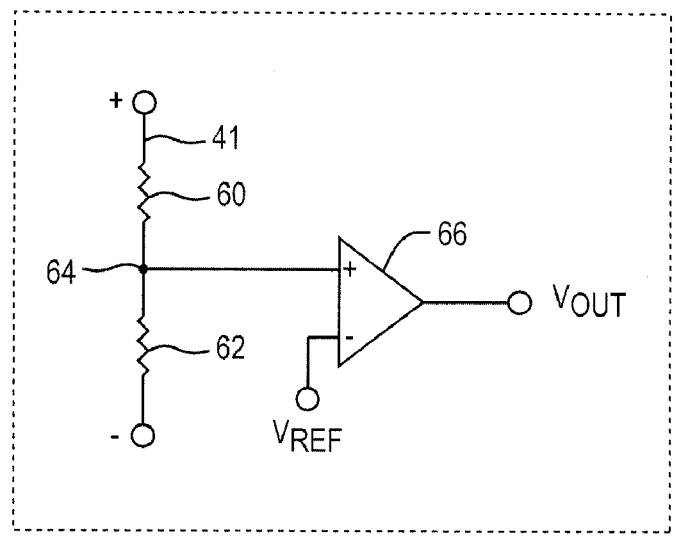
FIG. 15 is a simplified electrical schematic diagram of a voltage demodulation circuit in accordance with an embodiment of the present invention.
Figure 16:
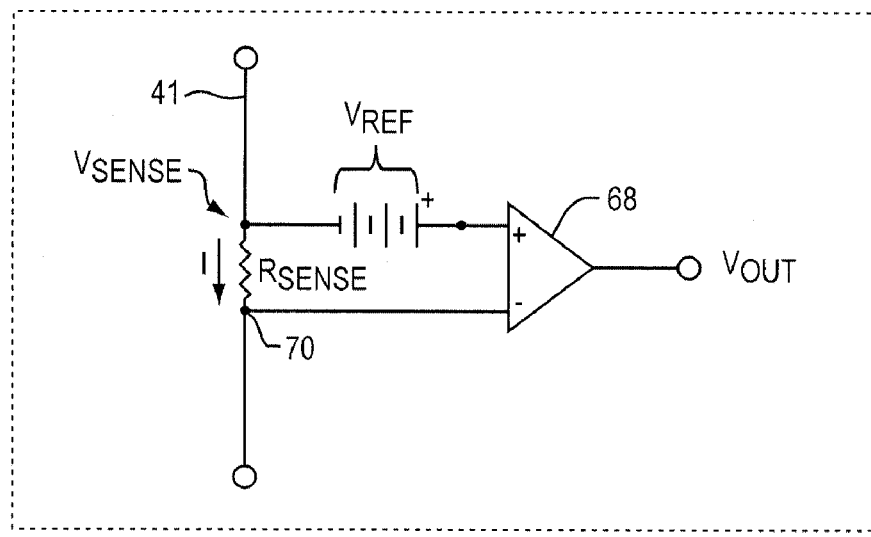
FIG. 16 is a simplified electrical schematic diagram of a current demodulation circuit in accordance with an embodiment of the present invention.

FIG. 15 is a simplified electrical schematic diagram of a demodulator circuit for detecting a modulated voltage. A voltage divider network comprising a pair of resistors 60, 62 provides an intermediate voltage at node 64. The signal from this node 64 and a reference voltage Vref is applied to an op amp 66 as shown which acts as a threshold detector or peak detector to produce an output voltage Vout which may be used as representative of the signal voltage modulated onto the inline power loop 41. More than one such detector may be used to detect different voltage levels over the same circuit as will now be apparent to those of ordinary skill in the art. FIG. 16 is a simplified electrical schematic diagram of a demodulator circuit for detecting a modulated current. The current (or a portion of the current) in the inline power loop 41 passes through a sense resistor having resistance Rsense. The voltage at the Vsense node has Vref subtracted from it so that Vin, the voltage seen by the op amp 68, is equal to Vsense-Vref. The inverting input to the op amp 68 is coupled to node 70. Vout is the output of op amp 68 and is representative of changes in the current signal I. Vout is then used for further processing in a conventional manner. In an embodiment of the present invention, the demodulators are made to track (by using a dynamic value for Vref) the average current and voltage conditions for the PD or PSE so that the extra amount of current/voltage seen is, by definition, modulation.

The present invention may be used in systems compliant with the IEEE 802.3af standard and in such cases the modulated currents and voltages created will need to comply with the requirements set forth in the standard—in some cases this may require the PSE/PD communications bandwidth to be limited, depending upon conditions. It should also be noted that the communications between the PSE and the PD may be configured to operate in a half-duplex mode (one at a time) or a full-duplex mode (both simultaneously), as desired. There is nothing to prevent the simultaneous use of current and voltage modulation for communications on the wired data telecommunications network segment. It should also be noted that while many of the communications arrangements described herein are between a single PSE and a single PD, any number of PDs or PSEs coupled to the same network segment may communicate among one another using this communication technique. Additionally, PSEs or PDs may communicate with devices which are not PSEs or PDs but which do include a Power Tap (PT or PT Device) such as that illustrated in FIG. 17. Conventional addressing schemes may be overlaid in order to direct communications to specific devices where more than one might be reached. Finally, those of ordinary skill in the art will now appreciated that this PD/PSE communication scheme can continue to operate as long as one conductor of each pair of conductors used for communication/power transfer is not severed. Normal Ethernet, for example, will not operate with either conductor severed. Accordingly, it provides some enhanced redundancy for the communication of messages between PSE and PD.

Figure 17:
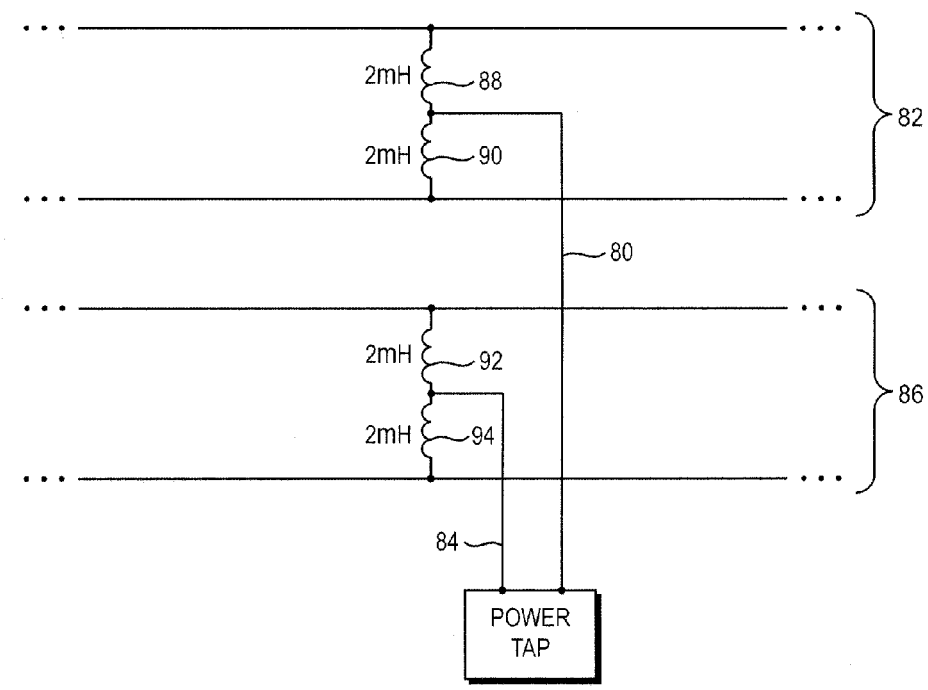
FIG. 17 is an electrical schematic diagram of a Power Tap device in accordance with an embodiment of the present invention.

Turning now to FIG. 17, a power tap includes a first conductor 80 coupled to a first pair of conductors 82 biased to a first potential and a second conductor 84 coupled to a second pair of conductors 86 biased to a second potential, the difference between the first potential and the second potential being a difference potential. A pair of inductors 88, 90 in an autotransformer configuration couple pair 82 to conductor 80 and a pair of inductors 92, 94 in an autotransformer configuration couple pair 86 to conductor 84. The inductors may be 2 mH inductors in a 100-ohm characteristic impedance transmission system as used in Ethernet.

Figure 18A:
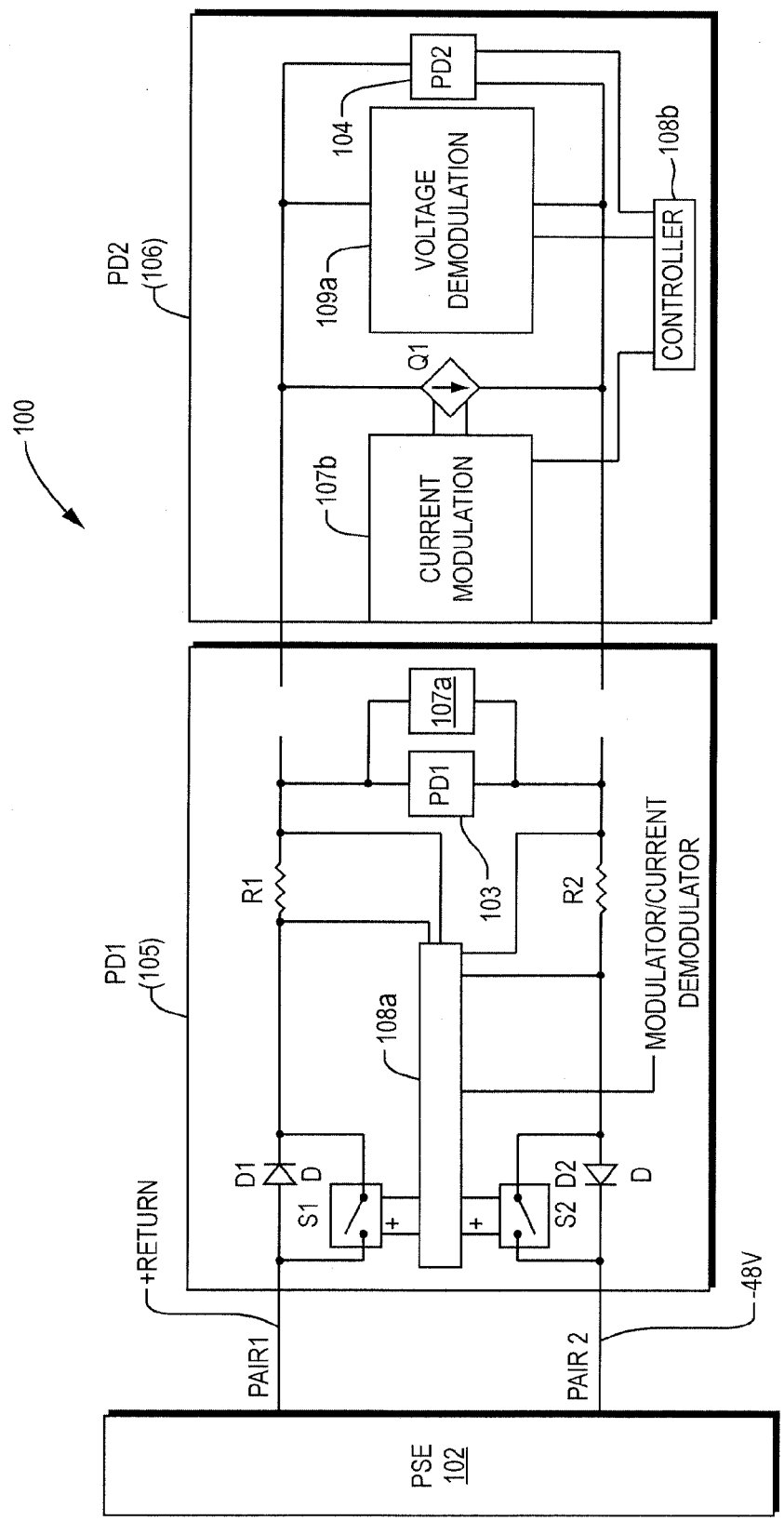
FIG. 18A is a simplified electrical schematic diagram of a PSE/PD1/PD2 configuration in accordance with an embodiment of the present invention.
Figure 18B:
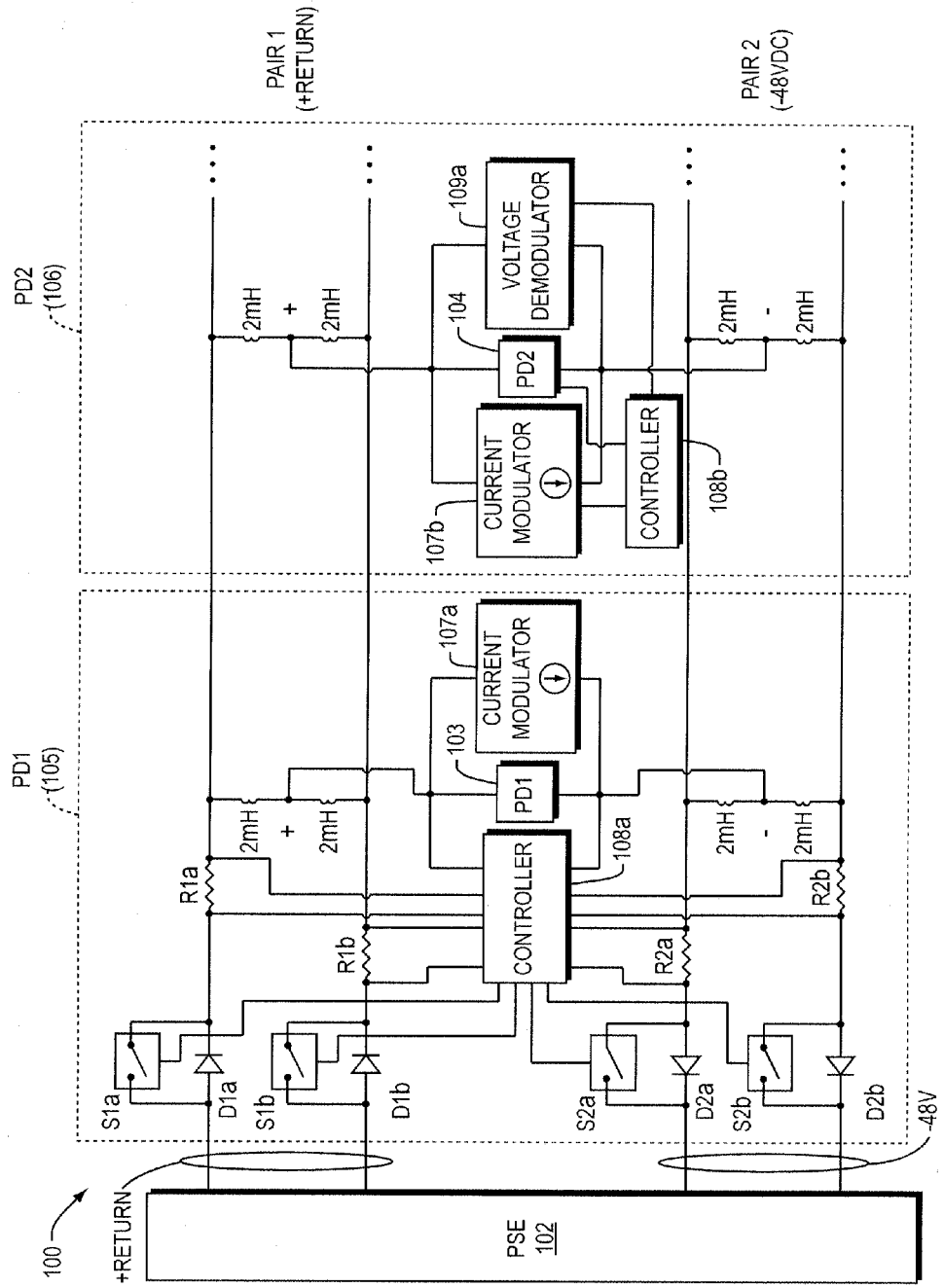
FIG. 18B is a more detailed electrical schematic diagram of the configuration of FIG. 18A.
Figure 19:
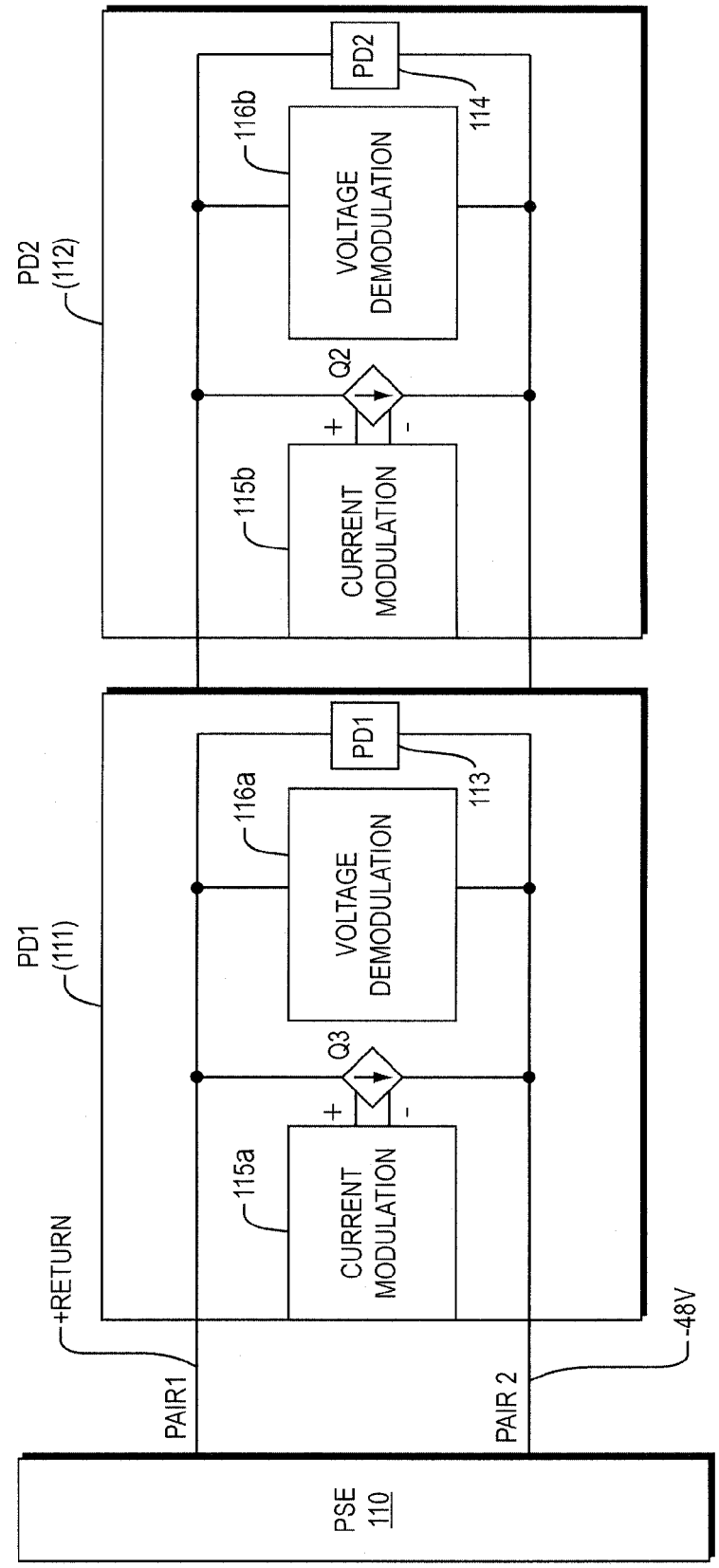
FIG. 19 is a simplified electrical schematic diagram of another PSE/PD1/PD2 configuration in accordance with an embodiment of the present invention.
Figure 20:
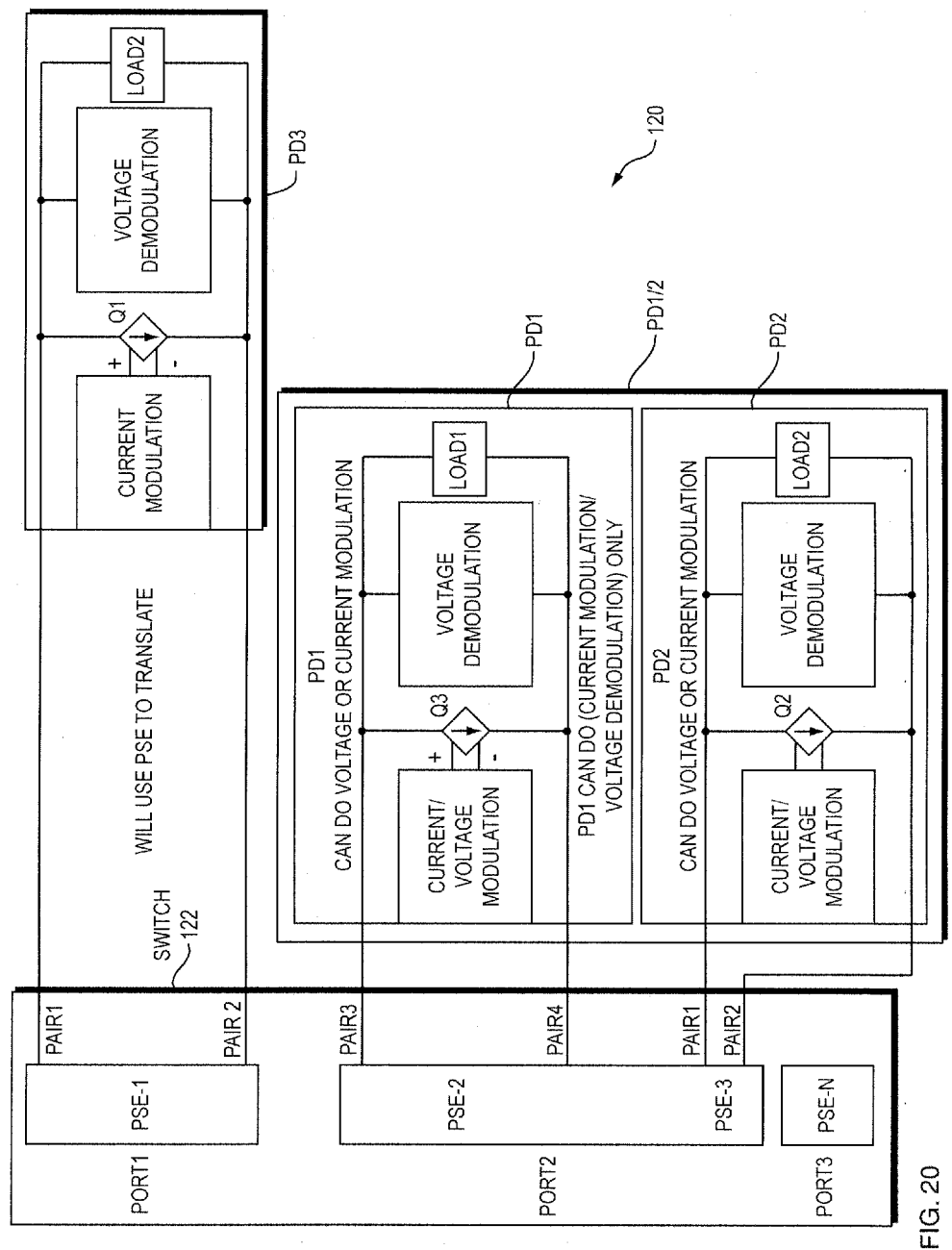
FIGS. 20 and 21 are simplified electrical schematic diagrams of more complex configurations of PSEs and PDs in accordance with embodiments of the present invention.
Figure 21:
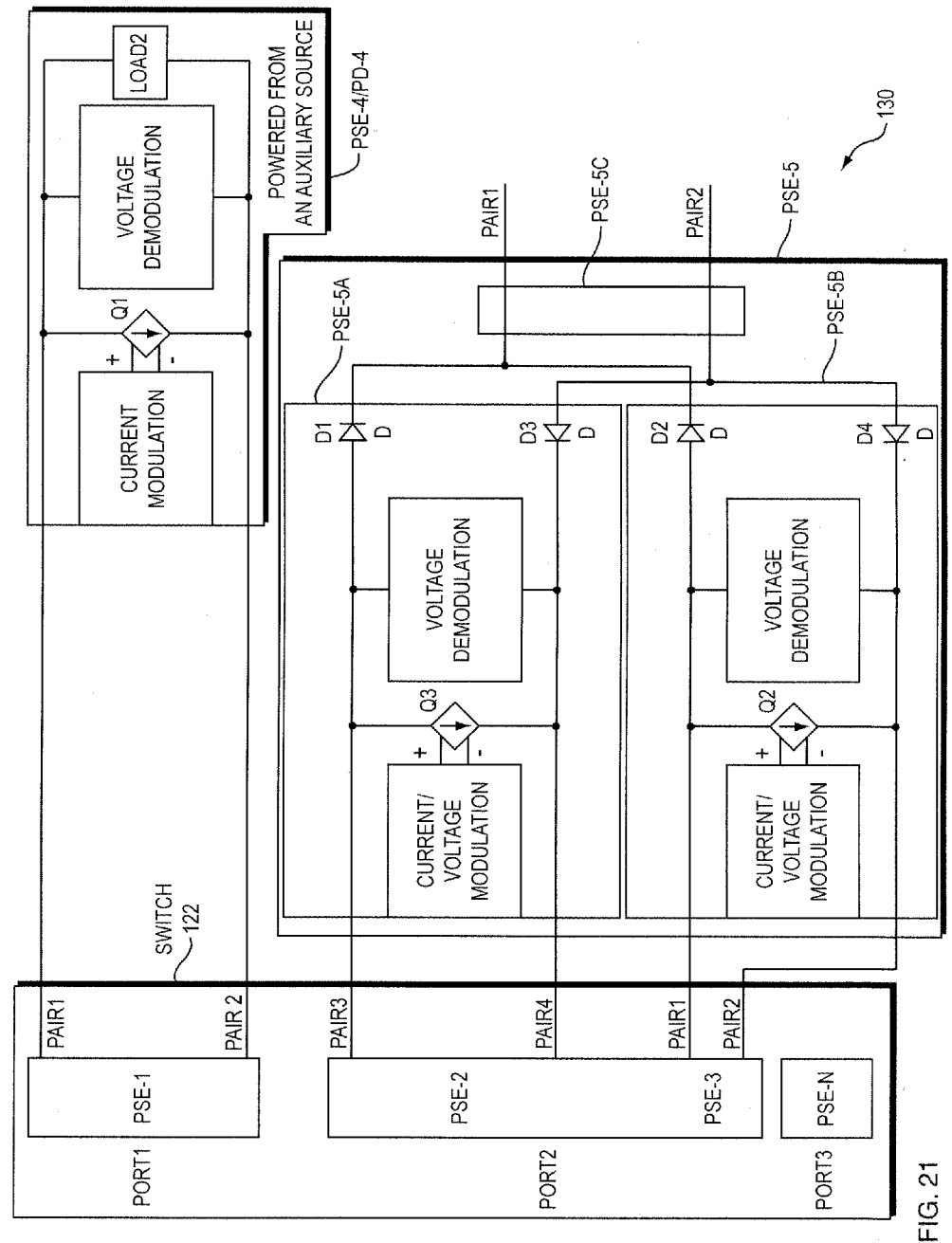

We now turn to some additional examples illustrating communication between stations on a wired data telecommunications network in accordance with various embodiments of the present invention. FIG. 18A and FIG. 18B (collectively referred to as FIG. 18) are schematic diagrams illustrating the same network segment. FIG. 18A explicitly shows each conductor of each of the two conductor pairs diagrammed. FIG. 18B is simplified to reduce complexity and only shows connectivity of the "pair". FIGS. 19, 20 and 21 use this approach as well in order to simplify the disclosure. In FIG. 18, a schematic of a network segment 100 is illustrated. A PSE 102 and a first PD device (PD1) (105) and a second PD device (PD2) (106) are shown coupled together over the same two pairs (Pair 1 and Pair 2) of conductors. In this case PD1 (105) can modulate the Inline Power voltage seen by PD2 (106) by taking the diode D1 (FIG. 18A—shown as diodes D1a and D1b in FIG. 18B) in and out of the circuit with switch S1 (FIG. 18A—shown as switches S1a and S1b in FIG. 18B).

There may be one or more than one independently switched diode D1 (D1a, D1b). If there were more independently switched diodes, it would be possible to send communications utilizing additional different voltage levels. PD1 (105) can current modulate with the current modulator block (107a) to communicate with the PSE 102 but it is not required to do so. PD1 (105) can voltage modulate the inline power supply to PD2 (106) by switching switches S1 (S1a, S1b) or S2 (S2a, S2b) (and causing switch S2 (S2a, S2b) to see a modulated voltage). PD2 (106) can modulate its current with its current modulation block (107b) and thereby "reply" to or otherwise communicate with PD1 (105). In accordance with this embodiment the PSE 102 need only supply the Inline Power—it need not communicate with either PD1 (105) or PD2 (106).

Note that in this situation it is also possible to power PD2 (106) with an external power source such as a wall transformer, battery, or other available power source (not shown in FIG. 18B). It could be, for example, a Voice Over Internet Protocol (VoIP) telephone device using the Inline Power as a backup power source. In that case it would be able to communicate with the PD1 (105) or PSE 102 by modulating its inline current. PD1 (105) can then demodulate the current signal from PD2 (106) across sense resistors R1 (R1a, R1b), R2 (R2a, R2b) or both, as described above; PSE 102 can also use the same approach with sense resistors internal to it. In FIGS. 18A and 18B controller 108a controls the operations of PD1 (105) and controller 108b controls the operations of PD2 (106) in a conventional manner. Voltage demodulator 109a is shown in PD2 (106) for demodulating voltage-modulated signals. While not shown, a similar voltage demodulator block could also be included in PD1 (105) for the same purpose, if desired. Note that in the FIG. 18B diagram the blocks denoted "PD1" (103) and "PD2" (104) are intended to connote the actual powered device circuitry which takes the inline power signal and converts it to a signal which can be used to power various components. Power distribution lines from the PD1 and PD2 boxes have been omitted from these diagrams for the sense of simplicity and clarity. Those of ordinary skill in the art will now realize that components requiring power may obtain it via conductors coupled to the appropriate PD block.

In the embodiments hereof where signal diodes are used to conduct signals and sometimes to be switched in and out of circuits for voltage modulation it is preferable that the diodes be well matched in electrical characteristics to avoid introducing current imbalances. This can be easily achieved by fabricating both diodes of a pair of diodes (e.g., D1a and D1b in FIG. 18B) on a single semiconductor die. While not shown herein, it is also desirable to protect such diodes with resetable inline fuses so that should a condition occur that could damage the diodes, the resetable fuses will open to prevent the damage. Such fuses are well known to those of ordinary skill in the art and therefore will not be further described herein. Also note that the current sense resistors such as R1a and R1b should similarly be matched in electrical characteristics although it is not necessary to use two per conductor pair and one per conductor pair could be used instead. They also play a current balancing role between the conductors of a pair which is helpful.

In FIG. 19 another network segment 110 is illustrated having PSE 110, PD1 and PD2. This figure has been simplified over that of FIG. 18A by removing circuitry (such as the controllers) which is not explicitly discussed. In accordance with this embodiment, PD1 (111) and PD2 (112) rely solely upon the PSE 110 for communicating. In this case each of PD1 (111) and PD2 (112) has a unique identifier to the PSE, i.e., it can be modulating its current in one way for PD1 (111) and another way for PD2 (112). For example, PD1 (111) could use AM modulation while PD2 (112) uses PWM, or different magnitudes of modulation or different timing could be used to distinguish between the stations associated with PD1 (111) and PD2 (112). In this case the PSE 110 performs a translation function by demodulating the current signal from each PD (111 and 112) and, responsively, modulating its own voltage to resend the information out on the Inline Power connection so that each PD (111 and 112) can receive and decode it. One way to do this is to have one PD use AM current modulation and AM demodulate the PSE inline voltage while the other PD using PWM modulated current would demodulate the PWM aspect of the supply voltage. To simplify the communications, the PSE may preface communications with a predetermined PWM or AM sequence to let one or the other PD know that it has an opening to communicate. An End of Data sequence may also be imbedded in the communications to indicate the end of the data so that other communications may thereafter take place.

FIG. 20 illustrates another network segment 120. This figure is simplified in the same manner as that of FIG. 19. In FIG. 20 there is a PD-PSE connection where each PD is coupled to a dedicated port on a network device (such as an Ethernet switch 122). In FIG. 20 PD1/2 is configured so that it is coupled to Port 2 which includes two PSEs, one PSE coupled to PD1 over Pair 1-2 and the second PSE coupled to PD2 over Pair 3-4. Since there are two PSE or equivalent ports in the network device coupled to a single PD, the PD may elect to use voltage modulation on either set of pairs that is not at that moment being used for power delivery to the PD (in that case, as explained above, only current modulation can be used by the PD). In this configuration, PD1 may communicate with PD2 or PD3 via the PSEs and switch 122 and the PSEs can act as a repeater or translator by demodulating the current signal (or voltage signal, if present) from PD3 and passing on the message to PD2 and/or PD1 through switch 122 using conventional means and from switch 122 using voltage modulation. To clarify, for the PD to do voltage modulation it can be locally powered off of some local power supply such as a wall transformer or a battery or the like and it would present a special signature/classification identification that a PSE would tell the PSE that the PD is capable of performing voltage modulation as a way to send a signal from the PD to the PSE, or the PSE may implement a back-off algorithm (i.e., waits and listens for a time) during its network identity discovery and may sense a valid modulation signal available from the PD that is powered by other means allowing for half-duplex voltage modulation on two pairs or full-duplex voltage modulation on four pairs. That PD, even though locally powered, may be configured to draw some minimal amount of power from the PSE to be able to communicate with the PD using current modulation from the PD to the PSE. The PSE must perform voltage demodulation to receive the voltage modulated signal from the PD. The signal between these devices need not be at any particular voltage since the PD in this case is not inline powered and does not require the full magnitude of the voltage normally supplied to inline powered devices. Accordingly, such a communication could take place at any desired voltage level, e.g., 5 VDC. If the PD is, instead, powered by inline power, then it may use current modulation to request a conversation with any other coupled device on the wired data telecommunication network segment. The PSE, in return, modulates the inline power voltage applied to the coupled devices in the network segment.

FIG. 21 illustrates another network segment 130. In FIG. 21 PSE-PSE communication is illustrated. Here PSE-5 (comprising PSE-5A and PSE-5B) can act as a PD with a special signature or Class in accordance with the IEEE 802.3af standard (in this case the PSE acts like a pseudo-PD ("PPD") where it does not draw its power from a PSE but it is capable of modulating PSE-supplied current for the purpose of communicating.) The PSEs may communicate with one another in various ways. In accordance with one embodiment of the present invention, PSE-PSE communication works as follows. One PSE attempting to communicate with another PSE does not apply any voltage to the cable coupling the two PSEs (because no PD signature is ever seen) but instead appears as a high impedance and (at least occasionally) either (1) listens for a voltage modulated signal on the cable indicating that the other device is a PSE, or (2) present a special signature signal or identity network so that the other device may recognize it for what it is. This is sometime known as "back off" where the PSE stops performing the IEEE 802.3af discovery algorithm in order to be able to listen for signals from other PSEs attempting to communicate (in this case half-duplex voltage modulation may be deployed at lower voltages to start the communication between the two devices and each PSE or PSE and PPD would need to be able to perform voltage demodulation as described above to decode the message). If it detects such another PSE it may negotiate a proper duplex (full or half—for example, one could default to half-duplex mode and if negotiations are successful, upgrade the link to full-duplex), protocol and speed of communications with that other entity. For Half-Duplex communications using voltage modulation only we initiate a Half-Duplex voltage modulation communications link between two PSE devices, e.g., PSE-1 and PSE-4/PD-4 where each have an op-amp to drive the modulated signal, the inline power signal is not being used to drive the PSE-4/PD-4 device (i.e., it is powered from another source during communication, or at least not over the pairs of conductors used for communication), and PSE-1 and PSE-4/PD-4 can communicate with one another via voltage modulation only when the talker is talking and the listener is quiet and not talking. An end of communication signal may be used to signal the availability of power, i.e., at that point the PSE-4/PD-4 device may use inline power from PSE-1. For Full-Duplex communications using voltage modulation from one side and current modulation from the other side we initiate a Full-Duplex communications link between two PSE devices, e.g., PSE-1 and PSE-4/PD-4. (Note that the cable used here must not be a "cross-over" cable, or, if so, a circuit should be provided at the PSE to automatically de-cross it or solve the clamping due to diodes on each PSE clamping the signal to one diode drop in each direction; also note that PSE to PSE communication or PSE to device communication where the device is not powered by the PSE can take place at any desired voltage and need not take place at the inline power voltage).

FIG. 21 also illustrates a case where the PSE-5 (PSE-5A/PSE-5B) device may connect to a single port of switch 122 having two PSEs (PSE-2 and PSE-3). Either PSE may source up to about 15 watts going in either direction (i.e., from PSE-5 to PSE-2/3 or vice versa or neither). If the inline power is not being used, it may be used for bidirectional communications (voltage modulation in one direction, current modulation in the other, or voltage modulation in both directions as discussed above). Given the capability of most PSEs to handle packet switching, it is possible now to switch packets of data communicating using the common mode signaling techniques discussed herein in a number ways. For example, the packets of information can be unconverted to Ethernet packets and sent over Ethernet in a conventional manner. In another example, the packets may be switched and routed in accordance with an Ethernet-like scheme but entirely using common mode signaling techniques from device to device to device within the wired data telecommunications network. In such a case a unique predetermined address value associated with a particular device (such as, for example, the unique Media Access Controller (MAC) addresses of the individual internet adapters) could be used as addresses for such a switching scheme. Note that in this configuration a single network device port 2 of network device 122 has four pair of conductors coupled to it and two pair are coupled as PSE-2 and the other two pair are coupled as PSE-3. In one embodiment of the present invention each can source up to about 15 watts of inline power to a coupled device such as PSE-5. PSE-5 then is configured to provide all of this inline power over a two pair of conductors as shown.

Those of ordinary skill in the art will now appreciate that in a configuration with a single PSE and two (or more) PDs the PSE may act as a "hub" or "repeater" of what each PD communicates and that the PSE may re-communicate that information to the other coupled PDs. Thus if two PDs are attached to a single PSE, the PSE might use a "protocol" to assign each PD a different identification value and thus one might use one modulation scheme (e.g., AM) and the other might use another modulation scheme (e.g., FM). Upon discovery the class of a PD might be used to configure an "address" or logical value for the PD. A PD may be configured to not communicate until it receives permission to do so in some fashion from a PSE.

As described above, it is possible for a remote station to measure a difference voltage between the two legs of the inline power signal with conventional voltage measuring circuitry well known to those of ordinary skill in the art. Since the remote station may be located at any distance from the station to which it is connected, the resistance of the wired data telecommunications network cabling will vary depending upon that length and other factors. Accordingly, each connection will likely have a different resistance and hence voltage drop (and power loss). Measuring the voltage at the remote end and sending it back to the local end provides a mechanism for equipment to calculate the voltage drop and power loss in each connection. If this information is known precisely, power can be allocated more precisely and efficiently. For example, under the IEEE 802.3af standard, a certain amount of power (in excess of 2 watts) is allocated for power loss in each 15 watt inline power connection. If the 2 watts is not, in fact, used then at least a portion of that power may be used for something else. Additionally, since the length of the cable may be inferred from the calculated voltage drop, this information may be used for a number of purposes. If the length "changes" (i.e., the voltage drop changes) it could mean that a cable is suffering or about to suffer a malfunction or that it has been compromised in some manner.

Note that any device described herein may, in addition, be powered some or all of the time by an auxiliary power supply such as a wall transformer, a battery, a rechargeable battery, or the like. Such a device may voltage modulate a signal over a wired connection to another device and the voltage magnitude may be any level (e.g., less than the 48V nominal inline voltage signal discussed herein). It may also use current modulation techniques by drawing only a small level of current from its auxiliary supply. PSE type devices may use this technique to "look" like PDs or emulate PDs by current modulating a signal for carrying out communications with other PSEs.

Also note that in order to reduce noise on the power supplies, different frequencies and modulation techniques may be used on the various ports of a device carrying out common mode communications so that the current draw from such communications averages out over short periods of time.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A method for communicating a message from a powered device (PD) to power sourcing equipment (PSE) in a wired data telecommunications network, the method comprising:

performing a PD detection and classification to verify that the PD is configured to be supplied with inline power from the PSE;

responsive to said performing, establishing an initial inline power relationship between the PD and the PSE so that the PD is receiving an initial minimum level of power from the PSE; and current modulating the inline power at the PD with a predetermined communications protocol to communicate the message from the PD to the PSE;

wherein establishing the initial inline power relationship comprises biasing a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts, wherein the message includes a request for a different minimum level of power from the PSE to the PD, and further comprising, responsive to said current modulating, providing the different minimum level of power from the PSE to the PD, wherein the first pair of conductors are used for performing at least the function of transmitting data from the PD to the PSE, and the current modulating will remain operable to communicate the message from the PD to the PSE even if at least one of the following occurs: (a) one conductor of said first pair of conductors is open, and (b) both conductors of said first pair of conductors are shorted together.

2. The method of claim 1, wherein: the PD is a voice over internet protocol telephone and the PSE is a switch.

3. An apparatus for communicating a message from a powered device (PD) to power sourcing equipment (PSE) in a wired data telecommunications network, the apparatus comprising:

means for performing a PD detection and classification to verify that the PD is configured to be supplied with inline power from the PSE;

means responsive to said means for performing, for establishing an initial inline power relationship between the PD and the PSE so that the PD is receiving an initial minimum level of power from the PSE; and means for current modulating the inline power at the PD with a predetermined communications protocol to communicate the message from the PD to the PSE;

wherein means for establishing the initial inline power relationship comprises means for biasing a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts,
wherein the message includes a request for a different minimum level of power from the PSE to the PD,
and further comprising means responsive to said current modulating for providing the different minimum level of power from the PSE to the PD,
wherein the first pair of conductors are used for performing at least the function of transmitting data from the PD to the PSE, and the means for current modulating will remain operable to communicate the message from the PD to the PSE even if at least one of the following occurs: (a) one conductor of said first pair of conductors is open, and (b) both conductors of said first pair of conductors are shorted together.

4. The apparatus of claim 3, wherein:
the PD is a voice over internet protocol telephone and the PSE is a switch.

5. A system for communicating a message from a powered device (PD) to power sourcing equipment (PSE) in a wired data telecommunications network, the system comprising:
circuitry for performing a PD detection and classification to verify that the PD is configured to be supplied with inline power from the PSE;
circuitry responsive to said circuitry for performing, for establishing an initial inline power relationship between the PD and the PSE so that the PD is receiving an initial minimum level of power from the PSE; and
circuitry for current modulating the inline power at the PD with a predetermined communications protocol to communicate the message from the PD to the PSE;
wherein circuitry for establishing the initial inline power relationship comprises circuitry for biasing a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts,
wherein the message includes a request for a different minimum level of power from the PSE to the PD,
and further comprising circuitry responsive to said current modulating for providing the different minimum level of power from the PSE to the PD,
wherein the first pair of conductors are used for performing at least the function of transmitting data from the PD to the PSE, and the circuitry for current modulating will remain operable to communicate the message from the PD to the PSE even if at least one of the following occurs: (a) one conductor of said first pair of conductors is open, and (b) both conductors of said first pair of conductors are shorted together.

6. The system of claim 5, wherein:
the PD is a voice over internet protocol telephone and the PSE is a switch.

7. A method for communicating a message from power sourcing equipment (PSE) to a powered device (PD) in a wired data telecommunications network, the method comprising:
performing a PD detection and classification to verify that the PD is configured to be supplied with inline power from the PSE;
responsive to said performing, establishing an initial inline power relationship between the PD and the PSE so that the PD is receiving an initial minimum level of power from the PSE; and
voltage modulating the inline power at the PSE with a predetermined communications protocol to communicate the message from the PSE to the PD;
wherein establishing the initial inline power relationship comprises biasing a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts,
wherein the message includes a confirmation of a request for a different minimum level of power from the PSE to the PD,
and further comprising, responsive to said voltage modulating, providing the different minimum level of power from the PSE to the PD,
wherein the first pair of conductors are used for performing at least the function of transmitting data from the PD to the PSE, and the voltage modulating will remain operable to communicate the message from the PD to the PSE even if at least one of the following occurs: (a) one conductor of said first pair of conductors is open, and (b) both conductors of said first pair of conductors are shorted together.

8. The method of claim 7, wherein:
the PD is a voice over internet protocol telephone and the PSE is a switch.

9. An apparatus for communicating a message from power sourcing equipment (PSE) to a powered device (PD) in a wired data telecommunications network, the apparatus comprising:
means for performing a PD detection and classification to verify that the PD is configured to be supplied with inline power from the PSE;
means responsive to said means for performing, for establishing an initial inline power relationship between the PD and the PSE so that the PD is receiving an initial minimum level of power from the PSE; and
means for voltage modulating the inline power at the PSE with a predetermined communications protocol to communicate the message from the PSE to the PD;
wherein means for establishing the initial inline power relationship comprises means for biasing a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts,
wherein the message includes a confirmation of a request for a different minimum level of power from the PSE to the PD,
and further comprising means responsive to said voltage modulating for providing the different minimum level of power from the PSE to the PD,
wherein the first pair of conductors are used for performing at least the function of transmitting data from the PD to the PSE, and the means for voltage modulating will remain operable to communicate the message from the PD to the PSE even if at least one of the following occurs: (a) one conductor of said first pair of conductors is open, and (b) both conductors of said first pair of conductors are shorted together.

10. The apparatus of claim 9, wherein: the PD is a voice over internet protocol telephone and the PSE is a switch.

11. A system for communicating a message from power sourcing equipment (PSE) to a powered device (PD) in a wired data telecommunications network, the system comprising:

circuitry for performing a PD detection and classification to verify that the PD is configured to be supplied with inline power from the PSE;

circuitry responsive to said circuitry for performing, for establishing an initial inline power relationship between the PD and the PSE so that the PD is receiving an initial minimum level of power from the PSE; and circuitry for voltage modulating the inline power at the PSE with a predetermined communications protocol to communicate the message from the PSE to the PD;

wherein circuitry for establishing the initial inline power relationship comprises circuitry for biasing a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts, wherein the message includes a confirmation of a request for a different minimum level of power from the PSE to the PD, and further comprising circuitry responsive to said voltage modulating for providing the different minimum level of power from the PSE to the PD, wherein the first pair of conductors are used for performing at least the function of transmitting data from the PD to the PSE, and the circuitry for voltage modulating will remain operable to communicate the message from the PD to the PSE even if at least one of the following occurs: (a) one conductor of said first pair of conductors is open, and (b) both conductors of said first pair of conductors are shorted together.

12. The system of claim 11, wherein:
the PD is a voice over internet protocol telephone and the PSE is a switch.

13. A powered device (PD) having a requirement for a minimum level of inline power supplied over a wired data telecommunications network from power sourcing equipment (PSE) to which the PD is coupled, the minimum level of inline power requirement subject to change from time to time, the PD comprising:

circuitry for determining a minimum level of inline power required by the PD;

circuitry for current modulating the inline power supplied over the wired data telecommunications network; and an encoder for encoding a message from the PD to the PSE on the current modulating circuitry communicating a present need for a changed minimum level of inline power, wherein the wired data telecommunications network includes a first pair of conductors used for performing at least the functions of supplying inline power to the PD from the PSE, encoding the message on the current modulating circuitry, and transmitting data from the PD to the PSE, and the current modulating circuitry will remain operable to communicate the message from the PD to the PSE even if at least one of the following occurs: (a) one conductor of said first pair of conductors is open, and (b) both conductors of said first pair of conductors are shorted together.

14. The apparatus of claim 13, wherein:
the circuitry for current modulating comprises at least one current source.

15. A powered device (PD) having a requirement for a minimum level of inline power supplied over a wired data telecommunications network from power sourcing equipment (PSE) to which the PD is coupled, the minimum level of inline power requirement subject to change from time to time, the PD comprising:

means for determining a minimum level of inline power required by the PD;

means for current modulating the inline power supplied over the wired data telecommunications network; and means for encoding a message from the PD to the PSE on the current modulating means communicating a present need for a changed minimum level of inline power, wherein the wired data telecommunications network includes a first pair of conductors used for performing at least the functions of supplying inline power to the PD from the PSE, encoding the message on the current modulating means, and transmitting data from the PD to the PSE, and the current modulating means will remain operable to communicate the message from the PD to the PSE even if at least one of the following occurs: (a) one conductor of said first pair of conductors is open, and (b) both conductors of said first pair of conductors are shorted together.

16. The apparatus of claim 15, wherein:
the means for current modulating comprises at least one current source.

17. The PD of claim 15, wherein:
the PD takes a first amount of time to complete a bootstrap operation after first application of power thereto, and
the determining means, modulating means and encoding means are all operable in less than said first amount of time.

18. A method for operating a powered device (PD) having a requirement for a minimum level of inline power supplied over a wired data telecommunications network from power sourcing equipment (PSE) to which the PD is coupled, the minimum level of inline power requirement subject to change from time to time, the method comprising:

determining a minimum level of inline power required by the PD; and encoding a message from the PD to the PSE by current modulating the inline power supplied over the wired data telecommunications network to the PD to communicate a need for a changed minimum level of inline power, wherein the wired data telecommunications network includes a first pair of conductors used for performing at least the functions of supplying inline power to the PD from the PSE, encoding the message by current modulating the inline power, and transmitting data from the PD to the PSE, and the current modulating will remain operable to communicate the message from the PD to the PSE even if at least one of the following occurs: (a) one conductor of said first pair of conductors is open, and (b) both conductors of said first pair of conductors are shorted together.

19. The method of claim 18, wherein:
the current modulating is accomplished using at least one current source.

20. The method of claim 18, further comprising:
bootstrapping the PD for operation, wherein:
the determining, modulating and encoding are able to take place prior to the completion of the bootstrapping.

21. A power sourcing equipment (PSE) device having a capacity to provide up to a first quantity of inline power over a wired data telecommunications network to a powered device (PD) to which the PSE is coupled, the PSE comprising:
  circuitry for receiving a request from the PD for a changed minimum level of inline power required by the PD;
  circuitry for voltage modulating the inline power supplied over the wired data telecommunications network from the PSE to the PD; and
  an encoder for encoding a message from the PSE to the PD on the voltage modulating circuitry communicating a present changed minimum level of inline power to be supplied from the PSE to the PD,
  wherein the wired data telecommunications network includes a first pair of conductors used for performing at least the functions of supplying inline power to the PD from the PSE, encoding the message on the voltage modulating circuitry, and transmitting data from the PD to the PSE, and the voltage modulating circuitry will remain operable to communicate the message from the PD to the PSE even if at least one of the following occurs: (a) one conductor of said first pair of conductors is open, and (b) both conductors of said first pair of conductors are shorted together.

22. The apparatus of claim 21, wherein:
the circuitry for voltage modulating comprises at least one transistor or diode.

23. A power sourcing equipment (PSE) device having a capacity to provide up to a first quantity of inline power over a wired data telecommunications network to a powered device (PD) to which the PSE is coupled, the PSE comprising:
  means for receiving a request from the PD for a changed minimum level of inline power required by the PD;
  means for voltage modulating the inline power supplied over the wired data telecommunications network from the PSE to the PD; and
  means for encoding a message from the PSE to the PD on the voltage modulating means communicating a present changed minimum level of inline power to be supplied from the PSE to the PD,
  wherein the wired data telecommunications network includes a first pair of conductors used for performing at least the functions of supplying inline power to the PD from the PSE, encoding the message on the voltage modulating means, and transmitting data from the PD to the PSE, and the voltage modulating means will remain operable to communicate the message from the PD to the PSE even if at least one of the following occurs: (a) one conductor of said first pair of conductors is open, and (b) both conductors of said first pair of conductors are shorted together.

24. The apparatus of claim 23, wherein:
the means for voltage modulating comprises at least one transistor or diode.

25. A method for operating a power sourcing equipment (PSE) device having a capacity to provide up to a first quantity of inline power over a wired data telecommunications network to a powered device (PD) to which the PSE is coupled, the method comprising:
  receiving a request from the PD for a changed minimum level of inline power required by the PD;
  voltage modulating the inline power supplied over the wired data telecommunications network from the PSE to the PD; and
  encoding a message from the PSE to the PD with said voltage modulating communicating a present changed minimum level of inline power to be supplied from the PSE to the PD,
  wherein the wired data telecommunications network includes a first pair of conductors used for performing at least the functions of supplying inline power to the PD from the PSE, encoding the message with the voltage modulating, and transmitting data from the PD to the PSE, and the voltage modulating will remain operable to communicate the message from the PD to the PSE even if at least one of the following occurs: (a) one conductor of said first pair of conductors is open, and (b) both conductors of said first pair of conductors are shorted together.

26. The method of claim 25, wherein:
the voltage modulating is accomplished using at least one transistor or diode.

27. The method of claim 25, further comprising:
bootstrapping the PSE for operation, wherein:
the receiving, modulating and encoding are able to take place prior to the completion of the bootstrapping.

28. A powered device (PD) for communicating a message to power sourcing equipment (PSE) in a wired data telecommunications network, the PD comprising:
  a first circuit for participating in a PD detection and classification process to verify that the PD is configured to be supplied with inline power from the PSE;
  a second circuit responsive to said first circuit, for establishing an initial inline power relationship between the PD and the PSE so that the PD is receiving an initial minimum level of power from the PSE; and
  a third circuit for current modulating the power at the PD with a predetermined communications protocol to communicate the message from the PD to the PSE;
  wherein the second circuit for establishing the initial inline power relationship is configured to bias a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts,
  wherein the message includes a request for a different minimum level of power from the PSE to the PD,
  and wherein the second circuit is further configured, responsive to said current modulating, to provide the different minimum level of power from the PSE to the PD,
  and wherein the first pair of conductors are used for performing at least the function of transmitting data from the PD to the PSE, and the third circuit will remain operable to communicate the message from the PD to the PSE even if at least one of the following occurs: (a) one conductor of said first pair of conductors is open, and (b) both conductors of said first pair of conductors are shorted together.

29. A power sourcing equipment (PSE) device for receiving a message from a powered device (PD) in a wired data telecommunications network, the PSE comprising:
  a first circuit for participating in a detection and classification process to verify that the PD is configured to be supplied with inline power from the PSE;
  a second circuit responsive to said first circuit, for establishing an initial inline power relationship between the PD and the PSE so that the PD is receiving an initial minimum level of power from the PSE; and
  a third circuit for demodulating a modulated current signal at the PSE received from the PD to receive the message from the PD at the PSE;

wherein the second circuit for establishing the initial inline power relationship is configured to bias a first pair of conductors with one direct current (DC) voltage level and a second pair of conductors with a second DC voltage level, the difference between the first and second voltage level being a difference voltage, the PD and PSE being powered by the difference voltage, and the difference voltage exceeding 20 Volts, wherein the message includes a request for a different minimum level of power from the PSE to the PD, and wherein the second circuit is further configured, responsive to said modulated current signal, to provide the different minimum level of power from the PSE to the PD, wherein the first pair of conductors are used for performing at least the function of transmitting data from the PD to the PSE, and the third circuit for current demodulating will remain operable to receive the message from the PD to the PSE even if at least one of the following occurs: (a) one conductor of said first pair of conductors is open, and (b) both conductors of said first pair of conductors are shorted together.

30. A method for communicating a message from a first station via a second station to a third station in a wired data telecommunications network, the first station comprising a powered device (PD), the second station comprising power sourcing equipment (PSE), and the third station comprising a PD, and the wired data telecommunications network having at least a first pair of conductors and a second pair of conductors for coupling the first station to the second station and at least a third pair of conductors and a fourth pair of conductors for coupling the second station to the third station, the method comprising:

biasing the first pair of conductors with one direct current (DC) voltage level and the second pair of conductors with a second DC voltage level, the difference between the first and second voltage levels being a first difference voltage; and voltage modulating the difference voltage with a predetermined communications protocol to communicate the message from the first station to the second station;

transmitting the message from the first station to the second station;

wherein during said biasing the difference voltage exceeds 20 Volts, wherein the message includes a request for a different minimum level of power from the PSE to the PD, and further comprising, responsive to said voltage modulating, providing the different minimum level of power from the PSE to the PD, and further comprising:

biasing the third pair of conductors with the one DC voltage level and the fourth pair of conductors with the second DC voltage level, the difference between the third and fourth voltage levels being a second difference voltage;

modulating the second difference voltage with a predetermined communications protocol to communicate the message from the second station to the third station, the modulating including at least one of current modulating and voltage modulating; and transmitting the message from the second station to the third station.

31. A method for communicating a message from a first station via a second station to a third station in a wired data telecommunications network, the first station comprising a powered device (PD), the second station comprising power sourcing equipment (PSE), and the third station comprising a PD, and the wired data telecommunications network having at least a first pair of conductors and a second pair of conductors for coupling the first station to the second station and at least a third pair of conductors and a fourth pair of conductors for coupling the second station to the third station, the method comprising:

biasing the first pair of conductors with one direct current (DC) voltage level and the second pair of conductors with a second DC voltage level, the difference between the first and second voltage levels being a first difference voltage; and current modulating the difference voltage with a predetermined communications protocol to communicate the message from the first station to the second station;

transmitting the message from the first station to the second station;

wherein said modulating takes place while at least one of the first station and the second station is powered by the difference voltage;

wherein during said biasing the difference voltage exceeds 20 Volts, wherein the message includes a request for a different minimum level of power from the PSE to the PD, and further comprising, responsive to said current modulating, providing the different minimum level of power from the PSE to the PD, and further comprising:

biasing the third pair of conductors with the one DC voltage level and the fourth pair of conductors with the second DC voltage level, the difference between the third and fourth voltage levels being a second difference voltage;

modulating the second difference voltage with a predetermined communications protocol to communicate the message from the second station to the third station, the modulating including at least one of current modulating and voltage modulating; and transmitting the message from the second station to the third station.

32. A method for communicating a message from a first station via a second station to a third station in a wired data telecommunications network, the first station comprising a powered device (PD), the second station comprising power sourcing equipment (PSE), and the third station comprising a PD, and the wired data telecommunications network having at least a first pair of conductors and a second pair of conductors for coupling the first station, the second station and the third station, the method comprising:

biasing the first pair of conductors with one direct current (DC) voltage level and the second pair of conductors with a second DC voltage level, the difference between the first and second voltage levels being a difference voltage; and voltage modulating the difference voltage with a predetermined communications protocol to communicate the message from the first station to the second station;

transmitting the message from the first station to the second station;

wherein said modulating takes place while at least one of the first station and the second station is powered by the difference voltage;

wherein during said biasing the difference voltage exceeds 20 Volts, wherein the message includes a request for a different minimum level of power from the PSE to the PD, and further comprising, responsive to said voltage modulating, providing the different minimum level of power from the PSE to the PD, and further comprising:
current modulating the difference voltage with a predetermined communications protocol to communicate the message from the second station to the third station;
transmitting the message from the second station to the third station.

33. A method for communicating a first message from a first station to a third station and a second message from the second station to the first station in a wired data telecommunications network, a second station providing inline power to the first station and the second station, the first station comprising a powered device (PD), the second station comprising power sourcing equipment (PSE), and the third station comprising a PD, and the wired data telecommunications network having at least a first pair of conductors and a second pair of conductors for coupling the first station, the second station and the third station, the method comprising:
biasing the first pair of conductors with one direct current (DC) voltage level and the second pair of conductors with a second DC voltage level, the difference between the first and second voltage levels being a difference voltage; and
voltage modulating the difference voltage with a predetermined communications protocol to communicate the first message from the first station to the second station;
transmitting the first message from the first station to the second station;
wherein said modulating takes place while at least one of the first station and the second station is powered by the difference voltage;
wherein during said biasing the difference voltage exceeds 20 Volts,
wherein the first message includes a request for a different minimum level of power from the PSE to the PD of the first station,
and further comprising, responsive to said voltage modulating, providing the different minimum level of power from the PSE to the PD of the first station, and further comprising:
current modulating the difference voltage with a predetermined communications protocol to communicate the second message from the second station to the first station;
transmitting the second message from the second station to the first station.

34. A method for communicating a message from a first station to at least one second station in a wired data telecommunications network, the first station and the second station comprising power sourcing equipment (PSE), and the wired data telecommunications network having at least a first pair of conductors and a second pair of conductors for coupling the first station to the at least one second station, the method comprising:
periodically conducting at the first station a first discovery process to determine if a powered device (PD) is present on the wired data telecommunications network, followed by a back off period;
listening during the back off period for a special signature indicating the presence of a PSE at the second station;
detecting the presence of a PSE at the second station; and
communicating, responsive to said detecting, with the PSE at the second station.

35. The method of claim 34, wherein said special signature comprises a unique identity network associated with PSEs.

36. The method of claim 34, wherein said special signature comprises a unique modulated signal associated with PSEs.

37. The method of claim 34, wherein said communicating takes place by modulating an inline power signal between the first station and the second station.

38. The method of claim 37, wherein said modulating includes current modulating.

39. The method of claim 37, wherein said modulating includes voltage modulating.

40. The method of claim 34, further comprising:
biasing the first pair of conductors with one direct current (DC) voltage level and the second pair of conductors with a second DC voltage level, the difference between the first and second voltage level being a difference voltage; and
current modulating a current flowing from the first pair of conductors to the second pair of conductors with a predetermined communications protocol to communicate the message from the first station to the at least one second station.

41. The method of claim 40, wherein said modulating takes place while at least one of the first station and the second station is powered by the difference voltage.

42. An apparatus for communicating a message from a first station to at least one second station in a wired data telecommunications network, the first station and the second station comprising power sourcing equipment (PSE), and the wired data telecommunications network having at least a first pair of conductors and a second pair of conductors for coupling the first station to the at least one second station, the apparatus comprising:
means for periodically conducting at the first station a first discovery process to determine if a powered device (PD) is present on the wired data telecommunications network, followed by a back off period;
means for listening during the back off period for a special signature indicating the presence of a PSE at the second station;
means for detecting the presence of a PSE at the second station; and
means for communicating, responsive to said detecting, with the PSE at the second station.

43. The apparatus of claim 42, wherein said special signature comprises a unique identity network associated with PSEs.

44. The apparatus of claim 42, wherein said special signature comprises a unique modulated signal associated with PSEs.

45. The apparatus of claim 42, wherein said means for communicating modulates an inline power signal between the first station and the second station.

46. The apparatus of claim 45, wherein said means for modulating current modulates.

47. The apparatus of claim 45, wherein said means for modulating voltage modulates.

48. The apparatus of claim 42, further comprising:
means for biasing the first pair of conductors with one direct current (DC) voltage level and the second pair of conductors with a second DC voltage level, the difference between the first and second voltage level being a difference voltage; and
means for current modulating a current flowing from the first pair of conductors to the second pair of conductors with a predetermined communications protocol to communicate the message from the first station to the at least one second station.

49. The apparatus of claim 48, wherein at least one of the first station and the second station is powered by the difference voltage.

50. A system for communicating a message from a first station to at least one second station in a wired data telecommunications network, the first station and the second station comprising power sourcing equipment (PSE), and the wired data telecommunications network having at least a first pair of conductors and a second pair of conductors for coupling the first station to the at least one second station, the system comprising:
- circuitry for periodically conducting at the first station a first discovery process to determine if a powered device (PD) is present on the wired data telecommunications network, followed by a back off period;
- circuitry for listening during the back off period for a special signature indicating the presence of a PSE at the second station;
- circuitry for detecting the presence of a PSE at the second station; and
- circuitry for communicating, responsive to said detecting, with the PSE at the second station.

51. The system of claim 50, wherein said special signature comprises a unique identity network associated with PSEs.

52. The system of claim 50, wherein said special signature comprises a unique modulated signal associated with PSEs.

53. The system of claim 50, wherein said circuitry for communicating modulates an inline power signal between the first station and the second station.

54. The system of claim 53, wherein said circuitry for modulating current modulates.

55. The system of claim 53, wherein said circuitry for modulating voltage modulates.

56. The system of claim 50, further comprising:
- circuitry for biasing the first pair of conductors with one direct current (DC) voltage level and the second pair of conductors with a second DC voltage level, the difference between the first and second voltage level being a difference voltage; and
- circuitry for current modulating a current flowing from the first pair of conductors to the second pair of conductors with a predetermined communications protocol to communicate the message from the first station to the at least one second station.

57. The system of claim 56, wherein at least one of the first station and the second station is powered by the difference voltage.

58. An apparatus for communicating a message from a first station to at least one second station in a wired data telecommunications network, the first station and the second station comprising power sourcing equipment (PSE), and the wired data telecommunications network having at least a first pair of conductors and a second pair of conductors for coupling the first station to the at least one second station, the apparatus comprising:
- a discoverer for periodically conducting at the first station a first discovery process to determine if a powered device (PD) is present on the wired data telecommunications network, followed by a back off period;
- a receiver for listening during the back off period for a special signature indicating the presence of a PSE at the second station;
- a detector for detecting the presence of a PSE at the second station; and
- a communicator for communicating, responsive to said detecting, with the PSE at the second station.

59. The apparatus of claim 58, wherein said special signature comprises a unique identity network associated with PSEs.

60. The apparatus of claim 58, wherein said special signature comprises a unique modulated signal associated with PSEs.

61. The apparatus of claim 58, wherein said communicator modulates an inline power signal between the first station and the second station.

62. The apparatus of claim 61, wherein said communicator utilizes current modulation.

63. The apparatus of claim 61, wherein said communicator utilizes voltage modulation.

64. The apparatus of claim 58, further comprising:
- a biaser for biasing the first pair of conductors with one direct current (DC) voltage level and the second pair of conductors with a second DC voltage level, the difference between the first and second voltage level being a difference voltage; and a modulator for modulating a signal flowing from the first pair of conductors to the second pair of conductors with a predetermined communications protocol to communicate the message from the first station to the at least one second station.

65. The apparatus of claim 64, wherein at least one of the first station and the second station is powered by the difference voltage.

\* \* \* \* \*